(12) United States Patent
Borhade

(10) Patent No.: US 11,934,367 B2
(45) Date of Patent: Mar. 19, 2024

(54) DATA MANAGEMENT AND DE-DUPLICATION AT A STORAGE SERVER

(71) Applicant: T-Mobile Innovations LLC, Overland Park, KS (US)

(72) Inventor: Varsha Borhade, Bothell, WA (US)

(73) Assignee: T-Mobile Innovations LLC, Overland Park, KS (US)

(*) Notice: Subject to any disclaimer, the term of this patent is extended or adjusted under 35 U.S.C. 154(b) by 0 days.

(21) Appl. No.: 17/496,115

(22) Filed: Oct. 7, 2021

(65) Prior Publication Data

US 2023/0112918 A1   Apr. 13, 2023

(51) Int. Cl.
| | |
|---|---|
| G06F 16/00 | (2019.01) |
| G06F 16/22 | (2019.01) |
| G06F 16/23 | (2019.01) |
| G06F 16/2457 | (2019.01) |

(52) U.S. Cl.
CPC ........ *G06F 16/221* (2019.01); *G06F 16/2322* (2019.01); *G06F 16/24573* (2019.01)

(58) Field of Classification Search
CPC ............. G06F 16/221; G06F 16/24573; G06F 16/2322
USPC ........................................................ 707/741
See application file for complete search history.

(56) References Cited

U.S. PATENT DOCUMENTS

| | | | | |
|---|---|---|---|---|
| 8,799,235 B2* | 8/2014 | Kacher | ................. | G06F 16/215 707/687 |
| 8,812,461 B2* | 8/2014 | Li | ....................... | G06F 16/1752 707/692 |
| 9,336,246 B2 | 5/2016 | Gorelik et al. | | |
| 2010/0198730 A1* | 8/2010 | Ahmed | ................... | G06F 21/30 380/278 |
| 2011/0320865 A1 | 12/2011 | Jain et al. | | |
| 2013/0086009 A1* | 4/2013 | Li | ....................... | G06F 16/1752 707/E17.009 |
| 2013/0124523 A1* | 5/2013 | Rogers | ................... | G16H 10/60 707/741 |
| 2013/0151490 A1* | 6/2013 | Chaturvedi | ........... | G06F 16/215 707/748 |
| 2013/0173530 A1* | 7/2013 | Laron | ................... | G06F 16/176 707/608 |
| 2014/0074801 A1* | 3/2014 | Kacher | ................. | G06F 16/215 707/E17.005 |
| 2014/0279876 A1* | 9/2014 | Prasanna | ............... | G06F 16/258 707/610 |

(Continued)

OTHER PUBLICATIONS

Borhade, Varsha, "Methods and Systems for Analyzing Similarities Across Tables and Databases to Perform De-Duplication in a Storage Server," filed Oct. 7, 2021, U.S. Appl. No. 17/496,129.

(Continued)

*Primary Examiner* — Tyler J Torgrimson

(57) ABSTRACT

A management server is configured to detect that a request to add a new column of data to a storage server has been received, determine that the new column of data is a duplicate of a column of data already stored at the storage server by comparing metadata describing the new column and the metadata describing the tables stored at the storage server, and, in response to the new column of data being the duplicate of the column of data already stored in the storage server, generate, by an interceptor application of the management server, an indication that the new column of data is already stored at the storage server.

20 Claims, 12 Drawing Sheets

(56) References Cited

U.S. PATENT DOCUMENTS

2014/0280160 A1* 9/2014 Scriffignano ............ G06F 16/29
707/737
2015/0347691 A1* 12/2015 Sethumadhavan .... G16H 10/60
707/741
2016/0371275 A1* 12/2016 Bernstein .......... G06F 16/24578
2021/0342320 A1* 11/2021 Ramani ................ G06F 40/211
2023/0113635 A1 4/2023 Borhade

OTHER PUBLICATIONS

Office Action dated Apr. 26, 2023, U.S. Appl. No. 17/496,129, filed Oct. 7, 2021.
Notice of Allowance dated Oct. 25, 2023, U.S. Appl. No. 17/496,129, filed Oct. 7, 2021.

* cited by examiner

DATA MANAGEMENT AND DE-DUPLICATION AT A STORAGE SERVER

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Service providers are increasingly migrating data from localized servers, owned and operated by the service provider itself, to a centralized storage server, such as a cloud-based storage server owned and operated by a third-party cloud hosting company. Such a migration provides several benefits to the service provider, such as substantially decreasing storage overhead and maintenance costs, while providing the ability to access the data in a secure manner from any location. In the cloud-based data storage solutions, the cloud hosting company provides a fixed-size server space in a storage server to service providers, possibly for a fee. The service providers may store data as needed in the fixed-size server space. The service provider still owns the stored data, but the hosting company owns and maintains the required hardware. The data may be stored across one or many storage servers, which may be configured by the cloud hosting company in one or more designated data centers. However, the data migrated to the centralized storage server may contain several redundancies, in which duplicates of data are unnecessarily stored in the storage space allocated to the service provider.

SUMMARY

In an embodiment, a system for performing data management and de-duplication is disclosed. The system comprises a management server and a storage server. The management server comprises a non-transitory memory and a processor. The non-transitory memory is configured to store instructions, and a storage index indicating metadata describing a plurality of tables stored at a storage server. The processor is configured to execute the instructions, which cause the processor to be configured to detect, by a listener application of the management server, that a request to add a new column of data to a storage server has been received, determine, by a scanner application of the management server, that the new column of data is a duplicate of a column of data already stored at the storage server by comparing metadata describing the new column and the metadata describing the tables stored at the storage server, wherein the metadata describing the new column indicates a sender of the request to add the new column, in response to the new column of data being the duplicate of the column of data already stored in the storage server, generate, by an interceptor application of the management server, an indication that the new column of data is already stored at the storage server, and transmit, to a user equipment using a server to user equipment application programming interface, the indication that the new column of data is already stored at the storage server, prompting a user of the UE to perform an action to prevent the new column of data to be stored at the storage server. The storage server is communicatively coupled to the management server, and wherein the storage server is configured to store the tables.

In another embodiment, a method performed by a management server for performing data management and de-duplication at a storage server is disclosed. The method comprises detecting, by a listener application of the management server, that a request to add a new column of data to the storage server has been received, determining, by a scanner application of the management server, using a storage index including metadata describing a plurality of tables stored at the storage server, whether the new column of data is a duplicate of a column of data already stored at the storage server by comparing metadata describing the new column and metadata describing a plurality of tables stored at the storage server, wherein the metadata describing the new column indicates a sender of the request to add the new column and a column name of the new column, and wherein the metadata describing the tables indicates a column name for each column in each of the tables, in response to the new column of data not being the duplicate of the column of data already stored at the storage server, transmitting, to the storage server using a server to storage application program interface, the new column of data, to instruct the storage server to store the new column of data, and storing, in the storage index in a memory of the management server, the metadata describing the new column of data, and in response to the new column of data being the duplicate of the column of data already stored in the storage server, transmitting, by an interceptor application of the management server, using a server to user equipment application programming interface, an indication to a user equipment that the new column of data is already stored at the storage server, prompting a user of the UE to perform an action to prevent the new column of data from being stored at the storage server.

In yet another embodiment, a management server for performing data management and de-duplication on a storage server is disclosed. The management server comprises a server to user equipment application programming interface, a non-transitory memory, and a processor. The non-transitory memory comprises instructions, and a storage index indicating metadata describing a plurality of tables stored at a storage server. The processor is configured to execute the instructions, which cause the processor to be configured to detect, by a listener application of the management server, that a request to add a new column of data to the storage server has been received, transmit, using the server to storage application programming interface, the new column of data to the storage server to instruct the storage server to store the new column of data, store, in the storage index, metadata describing the new column of data, update, by a scanner application of the management server, an inclusion list to include the new column of data, wherein the inclusion list indicates folders in the storage server to be scanned by the scanner application, determine, by the scanner application, that the new column of data is a duplicate of a column of data already stored at the storage server based on the metadata describing the new column and the metadata describing the tables, and transmit, to a user equipment, using the server to user equipment application programming interface, an indication that the new column of data is already stored at the storage server, prompting a user of the user equipment to perform an action to delete the new column of data recently stored at the storage server.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
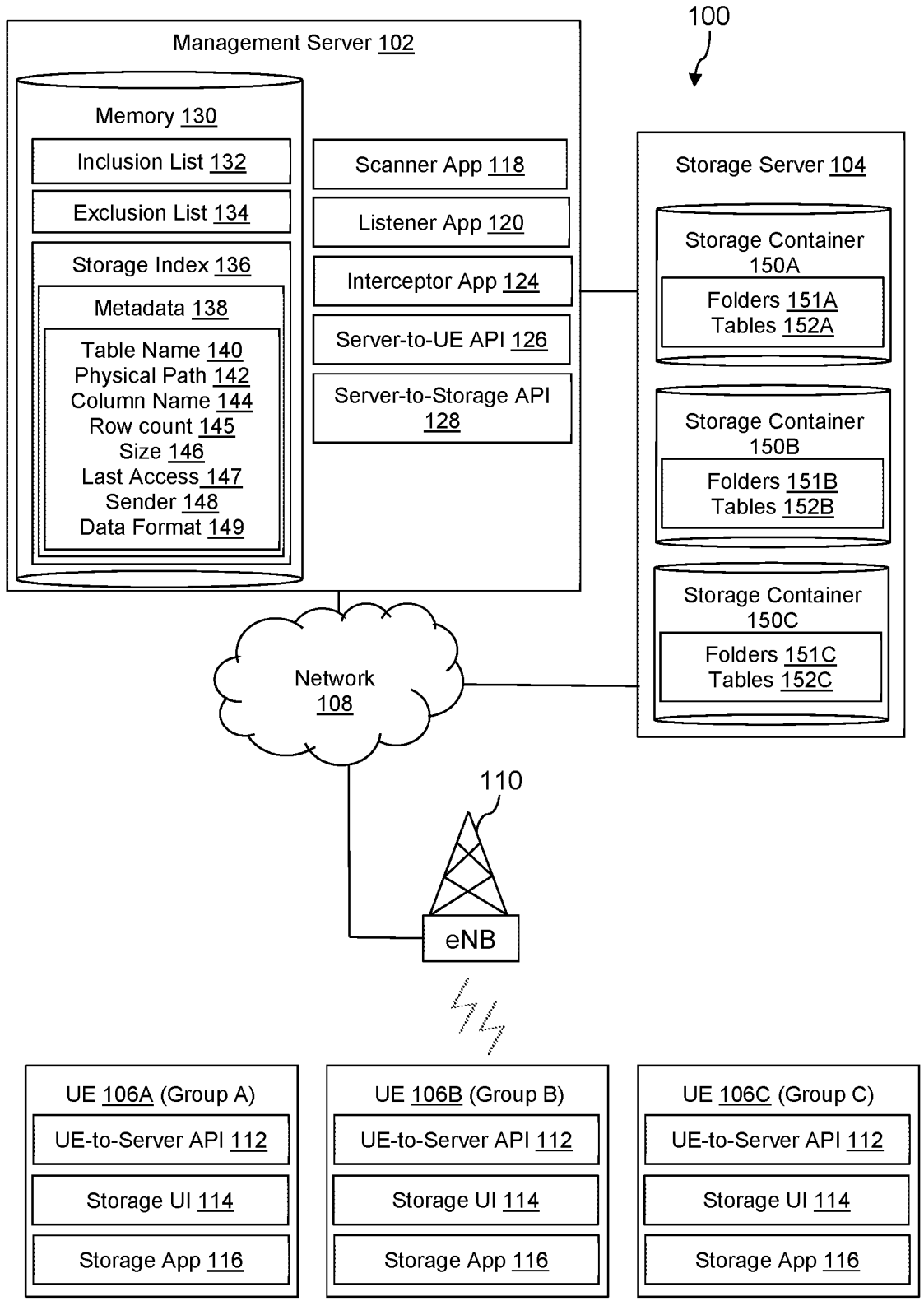
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

As mentioned above, service providers are increasingly migrating data from localized servers and data stores, owned and operated by the service provider itself, to remote storage servers and data stores, which may be owned and operated by a third-party hosting company. In some cases, the remote storage servers and data stores may be positioned in cloud computing environments and operated by third party cloud hosting companies. Examples of third party cloud hosting companies include, for example, MICROSOFT AZURE, AMAZON WEB SERVICES (AWS), etc. Each of these cloud hosting companies may include respective applications that provide database management and analytic related services to the customers storing data.

The storage servers may store the data for different service providers into separate data silos. Within a data silo of service provider, there may also be subdivision-based data silos for different subdivisions of the service provider, implemented in the form of storage containers. For example, supposing the service provider is T-MOBILE, the company T-MOBILE includes various subdivisions, such as, for example, billing, subscriptions, customer care, call detail record data, production, development, etc. Each of these subdivisions may store large amounts of data in a separate data storage, which may be local or stored remotely. For example, the billing subdivision may store billing related data in one data store at a first memory, and the customer care subdivision may store customer service related data in another data store at a second memory located separate from the first memory.

When the service provider migrates data from all the subdivisions into the centralized storage server, the data is merely transferred from the prior data stores to respective subdivision-based data silos within the centralized storage server. This data migration is often performed automatically, without the company or subdivision providing a record or data inventory of the actual data being migrated. In this way, large amounts of redundant data is often migrated, or forwarded through a network, to the centralized storage server. This redundant transmission of data leads to a largely unnecessary waste of computing and networking resources.

Similarly, as users (e.g., employees of the service providers) within different subdivisions continue to conduct business, additional data may be added to the storage server, without regard for the data that is already stored in the storage server. This is again due to the fact that companies do not often keep a record of the data stored in this centralized storage servers. Therefore, the storing of additional data that is already stored in the storage server (e.g., duplicate data), also creates an unnecessary waste of computing and networking resources, and the associated costs. This is particularly true in cloud-based storage solutions, in which adding data to the storage server is largely computing intensive, and requires additional fees.

Lastly, without a record or data inventory of data stored in the storage server, the host does not have a mechanism by which to govern the usage of storage space. In this context, to govern the usage of storage space may refer to assuring that the certain data is stored according to a particular policy, assuring that certain portions of the memory store certain types of data, assuring that certain security mechanisms are implemented for certain types of data/portions of the memory store, etc. This leads to a largely inefficient use of storage space, networking resources, computing resources, and the associated costs.

The embodiments disclosed herein seek to resolve the foregoing problems by performing data management and de-duplication at a storage server using automatic integration during data store migration, consolidation, and/or enhancement. In some embodiments, a management server is responsible for keeping a data inventory, in the form of a storage index, describing details of tables that are stored in the storage server. The management server may use the storage index to implement a computing and networking efficient method to reduce the instances of duplicate data being stored at the storage server.

In some cases, the storage server may store data for the different subdivisions of the service provider in different storage containers. Each storage container may include one or more folders, each of which may contain different files of different types, in which some of these files may be in the form of tables. For example, the files may be delta files, comma separated value (CSV) files, parquet files, or any other file that is encoded in the form of a table.

In an embodiment, the management server may also generate an exclusion list and an inclusion list. The exclusion list may indicate folders in the storage server that may not need to be scanned. The inclusion list may indicate folders in the storage server that are to be scanned to generate metadata and/or search for duplicates. In an embodiment, the management server may first scan the storage containers to determine the folders including one or more files in the form of tables. The management server may then add these folders to the inclusion list.

In an embodiment, the management server may then scan each of tables found in the folders indicated in the inclusion list. The management server may generate metadata for each table detected during the scan. The metadata may include, for example, a table name, a physical path to the table within the storage server, a column name for each column in the table, a row count, a size, a timestamp of a last access of the table, a sender, and/or a data format. The management server may store the metadata in the storage index, which provides a detailed overview of the tables stored in the storage server.

In some cases, the management server may receive a request to add (e.g., store) a new column of data to the storage server from a user equipment (UE) associated with one of the subdivisions. The request to add the new column of data may come in the form of one or more columns to be added to an existing table, or may come in the form of an entirely new table to add to a storage container. The management server may generate metadata regarding the new column of data, and the metadata may be similar to the metadata described above, and additionally include information indicating a sender of the request.

In an embodiment, instead of automatically adding the new column of data to the storage container associated with the subdivision of the UE, the management server may attempt to prevent duplicate data from being added to the storage server. The management server may first determine whether metadata of the tables already stored in the storage server match metadata of the new column. For example, the management server may use the column names to make this determination by comparing the column name of the new column with each of the column names in existing tables in the storage server. When at least one column name in the existing tables substantially matches the column name of the new column, the new column may be already stored in the storage server. In this case, the management server may respond to the UE with an indication that the new column consists of possibly duplicate data. When the UE receives the indication, the UE may use a storage server user interface (UI) of a storage server application executing at the UE to prompt the user to perform an action to prevent the new column of data from being redundantly stored at the storage server. For example, the prompt may indicate that the new column is likely already stored in a storage container of the storage server, provide a link to view details regarding the storage container at which this data may already be stored, and/or request the user to cancel the request to use the previously stored column instead.

In another embodiment, the management server may add the new column of data to the storage container associated with the subdivision of the UE after receiving the request. The management server may update the inclusion list to include the newly added column of data, and then generate metadata describing the newly added column of data, which is added to the storage index. The management server may then determine whether metadata of the tables already stored in the storage server match metadata of the new column to determine whether the newly added column was previously stored at the storage server. Similar to the embodiment described above, the management server may respond to the UE with an indication that the newly added column consists of duplicate data when the comparison indicates that the newly added column was previously stored at the storage server. When the UE receives the indication, the UE may use the storage server UI to prompt the user to perform an action, similar to the manner mentioned above.

Therefore, the embodiments disclosed herein keep a data inventory of the tables stored in the storage server in the form of a storage index, and the storage index stores metadata describing the tables. The management server uses the metadata in the storage index to determine duplicates or possible duplicates of columns of data, which can be used to prompt users to prevent storage of duplicate data, delete duplicate data, archive duplicate data, or even prevent migration of duplicate data. The management server may also use the storage index to provide governance to the maintenance and management of the storage server. Lastly, the management server may use the storage index to delete the redundant storage of private or personal data, such that all private or personal data for a company may only be stored at one or a predetermined number of locations. In this way, the management server may use the storage index to perform actions on the storage server to comply with government regulations on data privacy and help support compliance verification.

The embodiments disclosed herein also provide various improvements to the technical field of data storage from a hardware perspective. First, the embodiments disclosed herein clearly seek to conserve storage resources by reducing the storage of duplicate data. In addition, using the metadata, instead of the actual stored data, to detect duplicated data is computationally efficient method of duplicate data detection. Similarly, reducing the redundancies in the storage of personal and private data results in the saving of computing resources that would otherwise be used to maintain security of the data. Finally, by potentially preventing the transmission of data that is already stored at the storage server, the embodiments disclosed herein reduce the load on the network, thereby providing additional available bandwidth for significant, non-redundant data.

Turning now to FIG. 1, a system 100 is described. The system 100 comprises a management server 102, a storage server 104, one or more user equipment (UEs) 106A-C, a network 108, and a cell site 110. The cell site 110 may provide the UEs 106A-C a wireless communication link to the network 108, management server 102, and/or storage server 104 according to a 5G, a long term evolution (LTE), a code division multiple access (CDMA), or a global system for mobile communications (GSM) wireless telecommunication protocol. In this way, the UEs 106A-C may be communicatively coupled to the network 108, management server 102, and/or storage server 104 via the cell site 110.

The UEs 106A-C each may be a cell phone, a mobile phone, a smart phone, a personal digital assistant (PDA), an Internet of things (IoT) device, a wearable computer, a headset computer, a laptop computer, a tablet computer, or a notebook computer. In an embodiment, each of the UEs 106A-C may be owned and operated by a user of a separate subdivision or group within a single service providing company. For example, UE 106A may be part of the billing subdivision, UE 106B may be part of the customer care subdivision, and UE 106C may be part of the subscription plan subdivision. Each of the UEs 106A-C may include a UE-to-server application programming interface (API) 112, a storage UI 114, and a storage application 116. The UE-to-server API 112 may be an interface implemented using a set of functions that support establishment, maintenance, and communication via a wireless connection between each of the UEs 106A-C and either the management server 102 and/or the storage server 104, for example, using the cell site 110. The storage application 116 may an application by which the user can access information regarding the data stored at the storage server 104. The storage application 116 may also generate prompts for the user based on indications received from the management server 102. The storage UI 114 may be a user interface, managed by the storage application 116, that provides a visual representation of the data stored at the storage server 104. The storage UI 114 may also display the prompts generated by the storage application 116. As should be appreciated, the UEs 106A-C may include other APIs, applications, UIs, and data not otherwise shown in FIG. 1. While only three UEs 106A-C are shown in FIG. 1, it should be appreciated that the system 100 may include any number of UEs.

The network 108 may be one or more private networks, one or more public networks, or a combination thereof. In an embodiment, the management server 102 and the storage server 104 may be part of the network 108, but are illustrated separately in FIG. 1 to further clarify the present disclosure. In an embodiment, the network 108 may include a cloud computing environment provided by a host, and the cloud computing environment includes the management server 102 and the storage server 104. In this embodiment, the service provider associated with UEs 106A-C may reserve cloud computing resources to implement the components within the management server 102 and the storage server 104 on behalf of the service provider. The service providers may use the resources for the storage of data in the storage server 104, and perform operations at the storage server 104 using the management server 102.

The storage server 104 may also be implemented as a computer system, which is described further herein. In an embodiment, the storage server 104 provides access to one or more data stores that store customer data owned by various customers, such as the service provider associated with UEs 106A-C. The data store may include one or more hardware devices, such as, for example, non-transitory memories, hard drives, solid state memories, or any other type of memory capable of storing large amounts of data. In this case, the data store includes primarily hardware with data storage capabilities, but may also include processing servers as well. For example, the data store may be implemented as a data center, with a group of distributed memories used for remote storage, processing, and distribution of large amounts of data.

In an embodiment, the storage server 104 is part of the data store such that a processing server (e.g., processor) in the data store implements the functions of the storage server 104 described herein. In another embodiment, the storage server 104 and the data store are separate and distinct entities, in which the storage server 104 and the data store are coupled together in a wireless or wired manner. In this embodiment, the storage server 104 may communicate with the data store to implement the functions of the storage server 104 described herein. The term "storage server 104" as used herein should be understood to refer to both the storage server 104 (e.g., the server providing access to the customer data) and the data stores storing customer data.

The storage server 104 includes multiple storage containers 150A-C, and each of the storage containers 150A-C may be associated with a different subdivision of a single service providing company. For example, the storage container 150A may be associated with the billing subdivision, the storage container 150B may be associated with the customer care subdivision, and the storage container 150C may be associated with the subscription plan subdivision. The storage server 104 may be owned and operated by one or more hosts running applications, such as, for example, MICROSOFT AZURE, AWS, DELTA LAKE, DELTA ENGINE, etc. While only three storage containers 150A-C are shown in FIG. 1, it should be appreciated that the storage server 104 may include any number of storage containers 150A-C. Each storage container 150A-C may belong to a different non-transitory memory or may be distributed across multiple non-transitory memories.

Each storage container 150A-C may include folders 151A-C. As shown in FIG. 1, storage container 150A includes folder 151A, storage container 150B includes folder 151B, and storage container 150C includes folder 151C. While FIG. 1 only shows that the storage containers 150A-C include one folder 151A-C, it should be appreciated that each storage container 150A-C may include any number of folders 151A-C.

Each folder 151A-C may include one or more tables 152A-C. As shown in FIG. 1, folder 151A includes tables 152A, folder 151B includes tables 152B, and folder 151C includes tables 152C. The tables 152A-C may include files that are compressed or otherwise formatted as a table. The files may be delta files, CSV files, parquet files, or any other file that is encoded in the form of a table. Delta files include a proprietary format used in the AZURE data factory ecosystem. Parquet files have an open source file format available to any project in a HADOOP ecosystem supported by APACHE. CSV files are comma separated variable files. Each table 152A-C may include one or more columns and one or more rows for storing data for the particular subdivision.

The management server 102 may also be implemented as a computer system, which again is described further herein. The management server 102 may include a non-transitory memory 130, storing the inclusion list 132, the exclusion list 134, and the storage index 136. The exclusion list 134 may indicate folders 151A-C in the storage server 104 that may not need to be scanned for various reasons. For example, the folder 151A-C may not be permitted to be scanned, or the folder 151A-C may have already been scanned. The inclusion list 132 may indicate folders 151A-C in the storage server 104 that are to be scanned to generate metadata 138 and/or search for duplicates. The storage index 136 may store the metadata 138 describing the tables 152A-C stored in the storage server 104. In an embodiment, the metadata 138 may include, for example, a table name 140, a physical path 142 to the table 152 within the storage server 104, a column name 144 for each column in the tables 152A-C, a row count 145, a size 146, a timestamp indicating a last access 147 of the table 152A-C, and/or a data format 149 of the data. The table name 140 may indicate a name of the table 152A-C. A physical path 142 may indicate a physical path or location of the table 152A-C in the storage server 104. The column name 144 may indicate a name of a column in the tables 152A-C. The row count 145 may indicate a quantity of rows in the table 152A-C. The size 146 may indicate an actual size (in bits, megabits, etc.) of the table 152A-C, or a quantity of rows and columns in the table 152A-C. The timestamp of last access 147 may indicate a time at which the table 152A-C was last accessed. The data format 149 may indicate a format (e.g., integers, alphanumeric, string, etc.) of the data stored in a column or table 152A-C. In some cases, the metadata 138 may include a sender 148 of the table 152A-C or a column of the table 152A-C when the table 152A-C or column was newly added. The sender 148 may refer to a previous hop over which the table 152A-C or column was received, or an originator of the table 152A-C or column.

The management server 102 may execute a scanner application 118, a listener application 120, an interceptor application 124, a server-to-UE API 126, and a server-to-storage API 128. The scanner application 118 may scan (e.g., search through, browse, or inspect) the tables 152A-C in the folders 151A-C to obtain the metadata 138. The listener application 120 may detect when a request to add a new column to the storage server 104 is received. The listener application 120 may also determine metadata 138 associated with the new column. The interceptor application 124 may intercept the request to add a new column, and instead transmit a response back to the UE 106A-C indicating that the new column may already be stored in one of the tables 152A-C of the storage server 104. The server-to-UE API 126 may be an interface implemented using a set of functions that support establishment, maintenance, and communication via a wireless connection between the management server 102 and each of the UEs 106A-C, for example, using the cell site 110. The server-to-storage API 128 may be an interface implemented using a set of functions that support establishment, maintenance, and communication via a connection between the management server 102 and the storage server 104, for example, using the cell site 110, the network 108, or a wired link. As should be appreciated, the management server 102 may include other applications, data, and APIs not otherwise shown in FIG. 1.

As should be appreciated, the system 100 may include other components not shown in FIG. 1. The operations performed by the management server 102, storage server 104, and UEs 106A-C to implement data management and de-duplication at the storage server 104 will be further described below with reference to FIGS. 2, 3, 4A-B, 5, and 6. In some embodiments, the management server 102, storage server 104, and UEs 106A-C operate similar to those described in U.S. patent application Ser. No. 17/496,129, filed on Oct. 7, 2021, entitled "Methods and Systems for Analyzing Similarities Across Tables and Databases to Perform De-duplication in a Storage Server," by Varsha Borhade, which is hereby incorporated by reference in its entirety.

Figure 2:
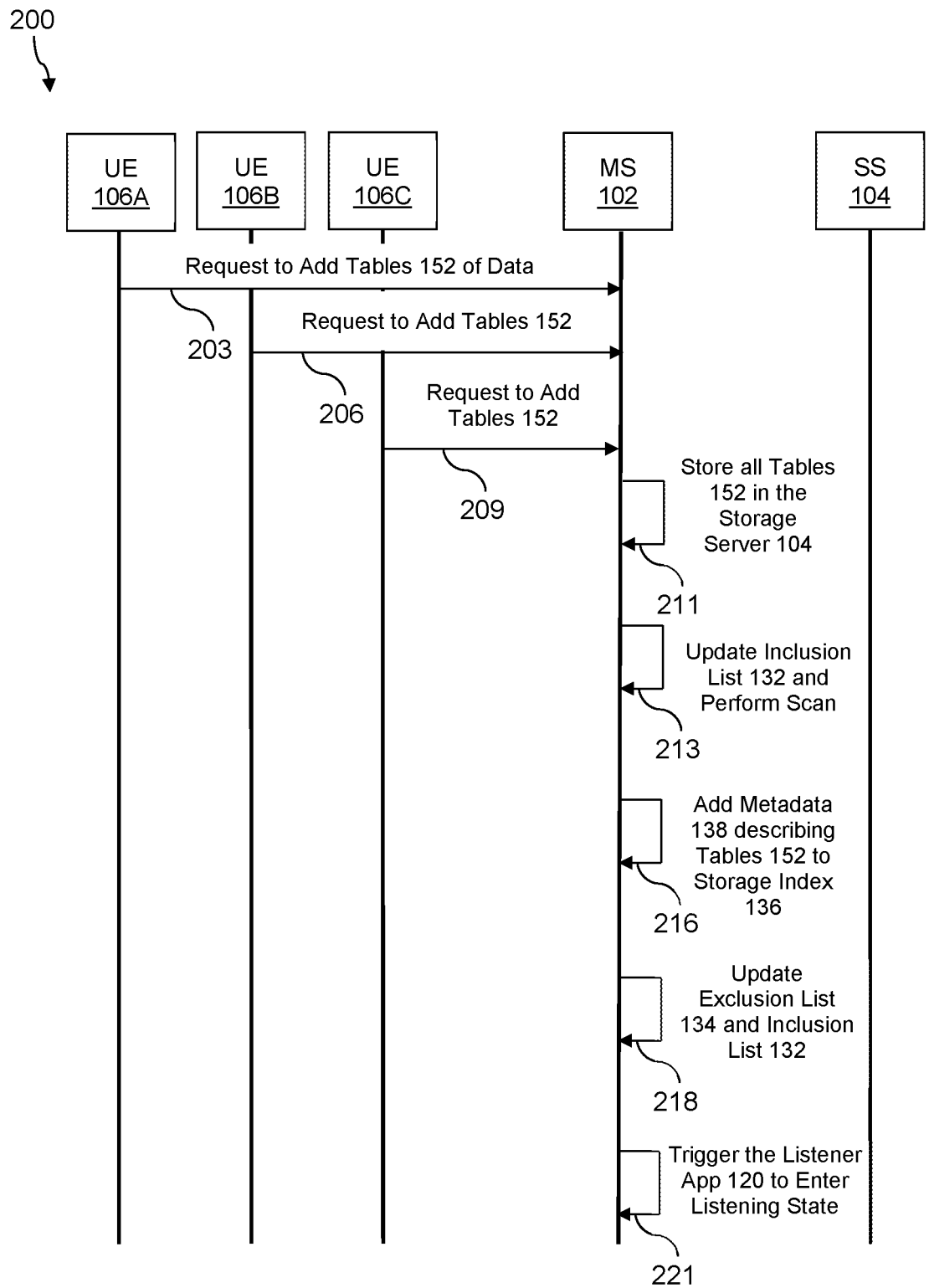
FIG. 2 is a message sequence diagram of a first method performed by the system of FIG. 1 according to an embodiment of the disclosure.

Referring now to FIG. 2, a message sequence diagram illustrating a method 200 for data management and de-duplication at the storage server 104 is described. The method 200 is performed by the UEs 106A-C, the management server 102 (shown in FIG. 2 as the "MS 102"), and the storage server 104 (shown in FIG. 2 as the "SS 104"). For example, method 200 may be performed when the UEs 106A-C begin instructing the migration of data associated with the various corresponding subdivisions to the storage server 104.

At step 203, UE 106A of the billing subdivision may transmit, to the management server 102, using the UE-to-server API 112, a request to add one or more tables 152A-C (hereinafter referred to as "tables 152") to the storage server 104. In some cases, the request may include the tables 152 (e.g., the content within the tables 152), an identifier of UE 106, an identifier of the billing subdivision, and/or other data associated with the tables 152, the UE 106A, or the billing subdivision. In some cases, the request may also include an address of location at which the tables 152 were stored prior to the request to migrate the tables 152 to the storage server 104. The tables 152 requested to be added by UE 106A may include columns and rows of data used by the service provider for billing purposes.

At step 206, UE 106B of the customer care subdivision may transmit, to the management server 102, using the UE-to-server API 112, a request to add one or more tables 152 to the storage server 104. The tables 152 requested to be added by UE 106B may include columns and rows of data used by the service provider for customer care purposes. Similarly, at step 209, UE 106C of the subscription plan subdivision may transmit, to the management server 102, using the UE-to-server API 112, a request to add one or more tables 152 to the storage server 104. The tables 152 requested to be added by UE 106C may include columns and rows of data used by the service provider for subscription plan management purposes. The requests from UE 106B and 106C may be formatted similar to the request from UE 106A described above.

At step 211, after the management server 102 receives, using the server-to-UE API 126, the requests to add tables 152 from UEs 106A-C, the scanner application 118 may store all the tables 152 in separate storage containers 150A-C of the storage server 104. For example, the tables 152 requested to be added by UE 106A may be stored to the storage container 150A associated with the billing subdivision, the tables 152 requested to be added by UE 106B may be stored to the storage container 150B associated with the customer care subdivision, and the tables 152 requested to be added by UE 106C may be stored to the storage container 150C associated with the subscription plan subdivision.

At step 213, the scanner application 118 may update the inclusion list 132 to reflect the newly added tables 152. The scanner application 118 may add the folders 151A-C (hereinafter referred to as "folders 151") of the newly added tables 152 to the inclusion list 132. The scanner application 118 may use the inclusion list 132 and the exclusion list 134 to determine the folders 151 to scan in the storage server 104. The scanner application may then scan each of the folders 151 in the inclusion list 132 for tables 152, and obtain information regarding the tables 152 to generate the metadata 138. At step 216, the scanner application 118 may generate metadata 138 describing the tables 152 that are being inspected during the scan. The scanner application 118 may add the metadata 138 describing the tables 152 to the storage index 136.

At step 218, the scanner application 118 may update the exclusion list 134 to include the folders 151 of the tables 152 that were just scanned, and update the inclusion list 132 to remove the folders 151 of the tables 152 that were just scanned. In this way, the scanner application 118 is prevented from unnecessarily scanning and generating metadata for folders of data that have already been scanned and recorded.

Subsequent to performing the scan, generating the metadata 138, and updating the inclusion list 132 and exclusion list 134, at step 221, the listener application 120 may be triggered at the management server 102 to listen to events occurring (e.g., requests being received) by the management server 102. The management server 102 may receive several types of requests from UEs and other computing devices based on data stored at the storage server 104, such as, for example, read requests, requests for metadata, requests to access a folder or file, write requests, etc. One such request that may be received is a request to add a new column to the storage server 104. In an embodiment, the listener application 120 may be trigger when a request to add a new column of data is received. Details regarding the processing of the new column of data is further described below with reference to FIGS. 3, 4A, and 4B.

Figure 3:
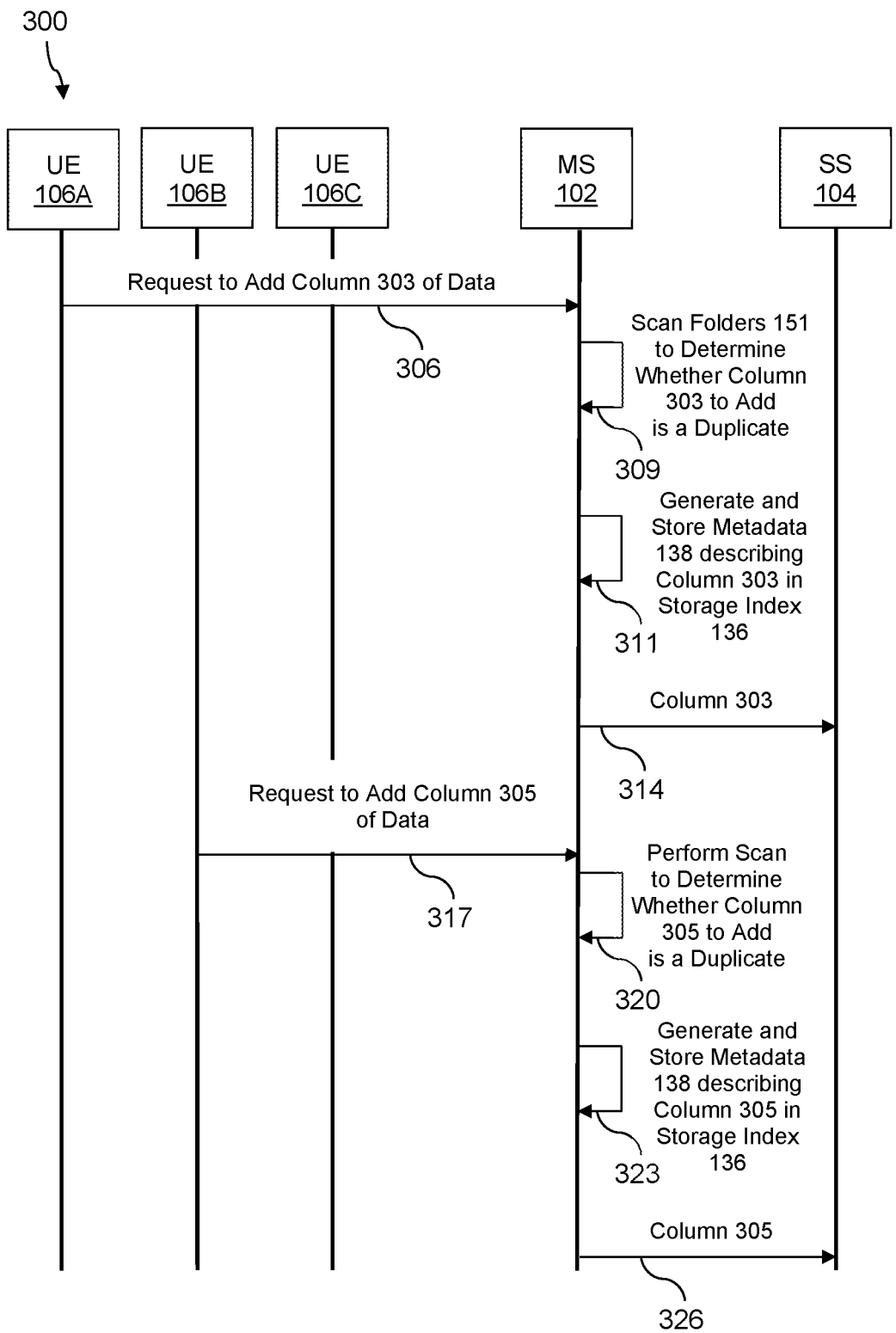
FIG. 3 is a message sequence diagram of a second method performed by the system of FIG. 1 according to an embodiment of the disclosure.

Referring now to FIG. 3, a message sequence diagram illustrating a method 300 of processing a request to add a new column of data is described. The method 300 is performed by the UEs 106A-C, the management server 102 (shown in FIG. 3 as the "MS 102"), and the storage server 104 (shown in FIG. 3 as the "SS 104"). For example, method 300 may be performed when the UEs 106A and 106B transmit a request to add a new column 303 or 306 of data to the storage server 104.

At step 306, UE 106A transmits, to the management server 102, using the UE-to-server API 112, a request to add a new column 303 of data to, for example, the storage container 150A. The request to add a new column 303 may be formed as either a request with one or more columns 303 of data to be added to an existing table 152, or a request to add a completely new table 152 with one or more new columns 303 (and possibly one or more already existing columns) to a storage container 150A-C. The request to add one or more new columns 303 to an existing table 152 may include a physical path to the existing table. The request to add a completely new table 152 may include an identifier or address of the storage location at which to add the new table 152.

The request to add a new column 303 of data is not the same as a request to update the data within a column, since data within columns are frequently updated in the storage server 104. Rather, the new column 303 of data refers to at least one column of data, which includes a column header and one or more entries in one or more rows of the new column 303.

As an example, the request sent at step 306 may include a request to add a new column 303 of billing data to a delta table 152. As mentioned above, billing data is typically stored in storage container 150A associated with the billing subdivision.

At step 309, in response to receiving the request to add the new column 303, the management server 102 executes the scanner application 118 to scan tables 152 in folders 151 of the storage server 104, to determine whether the new column 303 is a duplicate of a column of data already stored at the storage server 104. In an embodiment, the scanner application 118 may determine metadata 138 of the new column 303, and then compare the metadata 138 of the new column 303 with the metadata 138 of tables 152 and/or columns of data already stored at the storage server 104.

In an embodiment, the metadata 138 comprises the column name 144 for each column in the tables 152 stored in the storage server 104 and the data format 149 of each column in the tables 152 stored in the storage server 104. In this embodiment, the scanner application 118, or the listener application 120, determines whether the new column 303 is a duplicate based on wherein the column name 144 and the data format 149 of the new column 303 matches, using the string pattern matching algorithm, the column name 144 and the data format 149 of one or more tables 152 stored at the storage server.

For example, the scanner application 118 may compare a column name 144 of the new column 303 with the column name 144 of other columns in the tables 152 stored at the storage server 104. In this example, the scanner application 118 finds that a table 152 in the storage server 104 includes a column name 144 that matches (or substantially matches based on a string pattern algorithm) the column name 144 of the new column 303, the scanner application 118 determines that the new column 303 may be a duplicate of the one or more columns stored at the storage server 104. In an embodiment, the other metadata 138 (e.g., table name 140, physical path 142, row count 145, size 146, timestamp indicating the last access 147, and/or data format 149) may be compared in a similar fashion to determine, or further strengthen the confidence of the determination that the new column 303 may be a duplicate of other columns in tables 152 stored at the storage server 104.

In an embodiment, a string pattern matching algorithm may be used to compare metadata 138 stored in the form of strings to ensure that table names 140 and column names 144 that may not have the exact same names, but store substantially the same type of data, are considered matching. For example, example a column name 144 "DEALER-NAME:STRING" and another column name 144 "DEALER_NAME:STRING" are not identical strings, but still may be considered as matching column names 144 using a string pattern matching algorithm. The embodiments may employ any string matching algorithm (e.g., a Boyer-Moore (BM) algorithm, a Knuth Morris Pratt (KMP), etc.), and the embodiments are not limited to a particular type of string pattern matching algorithm.

In an embodiment, certain metadata 138 may be allocated a higher weight in the determination of whether the new column 303 is a duplicate. For example, the column name 144 and the data format 149 may be allocated a higher weight than the row count 145 and the timestamp indicating the last access 147. For example, the row counts 146 do not necessarily need to match for a new column 303 to be found as a duplicate of another already stored column. In another case, whether the row counts 146 match may not need to be considered when the column names 144 match. In the case in which the column names 144 match, the data format 149 may still be considered, because columns cannot be considered duplicates unless the data formats are the same. For example, if the new column 303 includes a column name "Subscription Plans" with rows indicating integer values (e.g., data format 148), and an existing column includes a column name "Subscription Plans" with rows indicating alphabet values (e.g., data format 148), the two columns cannot be considered duplicates.

In the example shown in FIG. 3, the new column 303 is not a duplicate of another column of data existing in the storage server 103. As such, at step 311, the scanner application 118, or the listener application 120, may generate metadata 138 describing the new column 303, which may be stored in the storage index 136. At step 314, the management server 102 transmits, to the storage server 104, using the server-to-storage API 128, the new column 303 of data with an instruction to store the new column 303 of data in a particular storage container 150A-C or a table 152. The storage server 104 may store new column 303 of data in the storage container 150A-C or a table 152.

At step 317, UE 106B transmits, to the management server 102, using the UE-to-server API 112, a request to add a new column 305 of data to, for example, the storage container 150B. For example, the request sent at step 317 may include a request to add a new column 305 of account data to a delta table 152. At step 320, in response to receiving the request to add the new column 305, the management server 102 executes the scanner application 118 to scan tables 152 in folders 151 of the storage server 104, to determine whether the new column 305 is a duplicate of a column of data already stored at the storage server 104. In the example shown in FIG. 3, the new column 305 is not a duplicate of another column of data existing in the storage server 103. As such, at step 323, the scanner application 118, or the listener application 120, may generate metadata 138 describing the new column 305, which may be stored in the storage index 136. At step 326, the management server 102 transmits, to the storage server 104, using the server-to-storage API 128, the new column 305 of data with an instruction to store the new column 305 of data in a particular storage container 150A-C or a table 152.

Figure 4A:
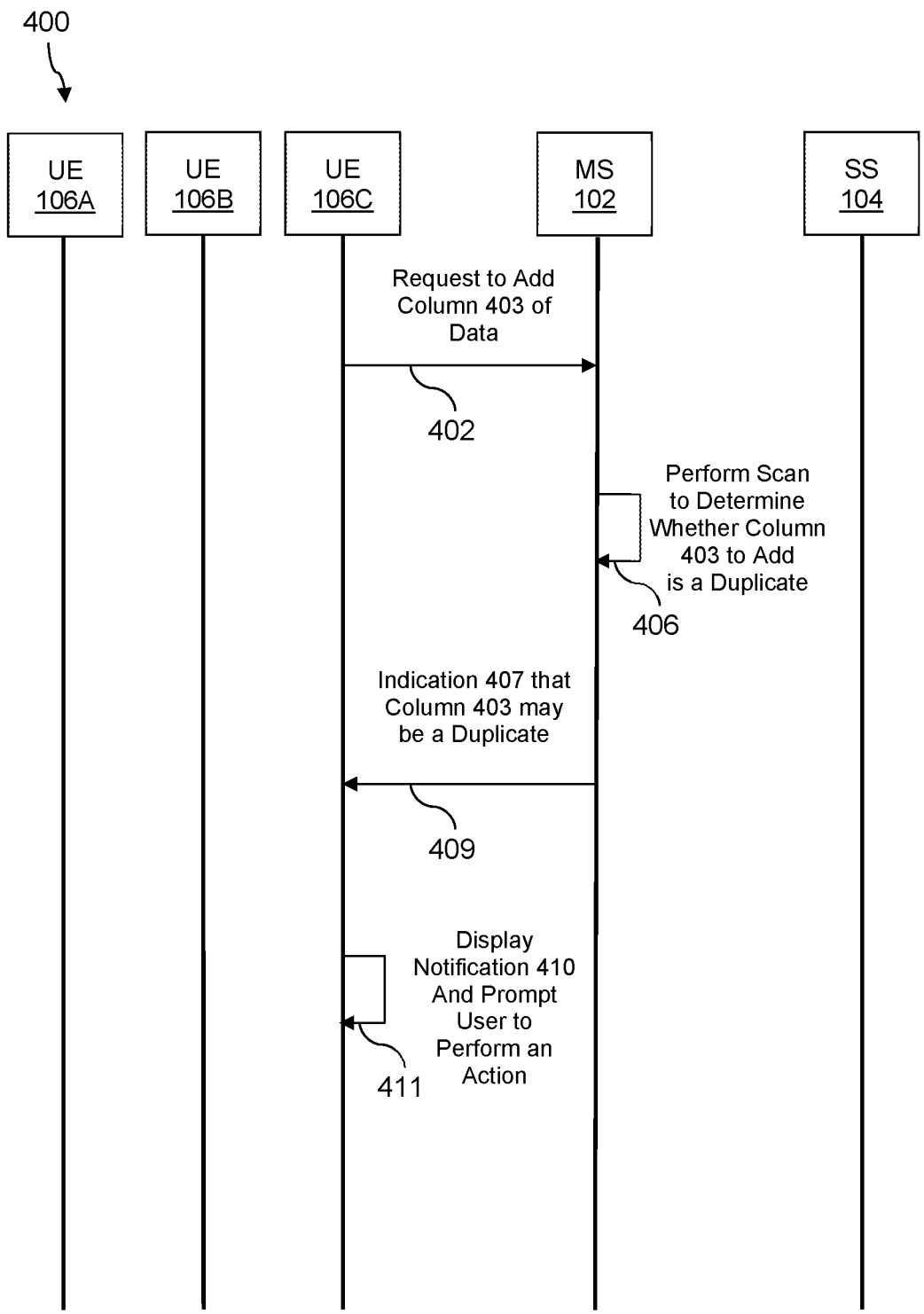
FIG. 4A is a message sequence diagram of a third method performed by the system of FIG. 1 to prevent storing duplicate data according to an embodiment of the disclosure.

Referring now to FIG. 4A, a message sequence diagram illustrating a first method 400 of processing a request to add a new, duplicate column of data is described. The method 400 is performed by the UEs 106A-C, the management server 102 (shown in FIG. 4A as the "MS 102"), and the storage server 104 (shown in FIG. 4A as the "SS 104"). For example, method 400 may be performed when the UEs 106A and 106B transmit a request to add a new column 403 of data to the storage server 104.

At step 402, UE 106C transmits, to the management server 102, using the UE-to-server API 112, a request to add a new column 403 of data to, for example, the storage container 150C. For example, the request sent at step 402 may include a request to add a new column 403 of billing data to the delta table 152, similar to the new column 303 of billing data sent at step 306 of method 300.

At step 406, in response to receiving the request to add the new column 403, the management server 102 executes the scanner application 118 to scan tables 152 in folders 151 of the storage server 104, to determine whether the new column 403 is a duplicate of a column of data already stored at the storage server 104. In the example shown in FIG. 4, the new column 403 may be a duplicate of another column of data existing in the storage server 103 since the new column 403 is similar to the column 303 already added to the storage server in method 300 of FIG. 3. The new column 403 and new column 303 may include, for example, matching column names 144 and data formats 149. The scanner application 118 may determine that the new column 403 is a duplicate of column 303, already stored at the storage server 104, based on the matching metadata 138 (e.g., column names 144 and data formats 149).

At step 409, the interceptor application 124 triggers the management server to transmit, to the UE 106C, using the server-to-UE API 126, a response including an indication 407 that the new column 403 may be a duplicate of another column of already existing in the storage server 104. For an example, the indication 407 may be a bit or a flag in a response message transmitted to the UE 106C.

At step 411, the UE 106C executes the storage application 116 to display a notification 410 using the storage UI 114 in response to receiving the indication 407. For example, the notification 410 may indicate that the new column 403 is already stored in the storage server 104. The notification 410 may provide a link to view details regarding that storage container 150A-C with the previously stored column (storage container 150A including column 303), for example, in the form of a visual representation. The notification 410 may also provide an interface by which the user may make a selection or enter an input to cancel the request to add the new column, and therefore use the previously stored column instead.

In an embodiment in which the metadata 138 describing the new column 403 indicates the sender 148 of the new column 403, the notification 410 may provide a link to view and display data stored by the sender 148 of the new column. For example, if the sender 148 is a device in a particular subdivision, the displayed data stored by the sender 148 may include data stored particularly by the sender 148 or by one or more other devices in the subdivision. That is, the displayed data may include other data within the storage container 150A-C at which other data of the sender 148 may be stored.

In these embodiments, the existence of the storage index 136 enables the management server 102 to provide governance to the maintenance and management of the storage server 104. For example, the management server 102 may use the storage index 136 to obtain a detailed overview of the schema and data stored in tables 152 at the storage server 104. The management server 102 may enforce policies using the storage index 136, in which the policies may indicate how the storage of data in the storage server 104 can be optimized and secured.

For example, the management server 102 may enforce security policies to mandate the deletion of redundant data that may pose privacy concerns, such as personally identifiable information (PII), such that all systems within a single company that accesses such PII must use the private data stored at a single location in the storage server 104. This may make governance of PII easier and more reliable. This also may make verification of PII governance, for example during a government audit of corporate compliance with data privacy regulations, easier and more reliable. The management server 102 may also impose encryption rules on the storage and transmission of this private data.

In some embodiments, the management server 102 may use the storage index 136 to implement microservices on the data itself or for applications using the data. The management server 102 may also use the storage index 136 to perform artificial intelligent methods on the data, to further optimize the storage of data.

Figure 4B:
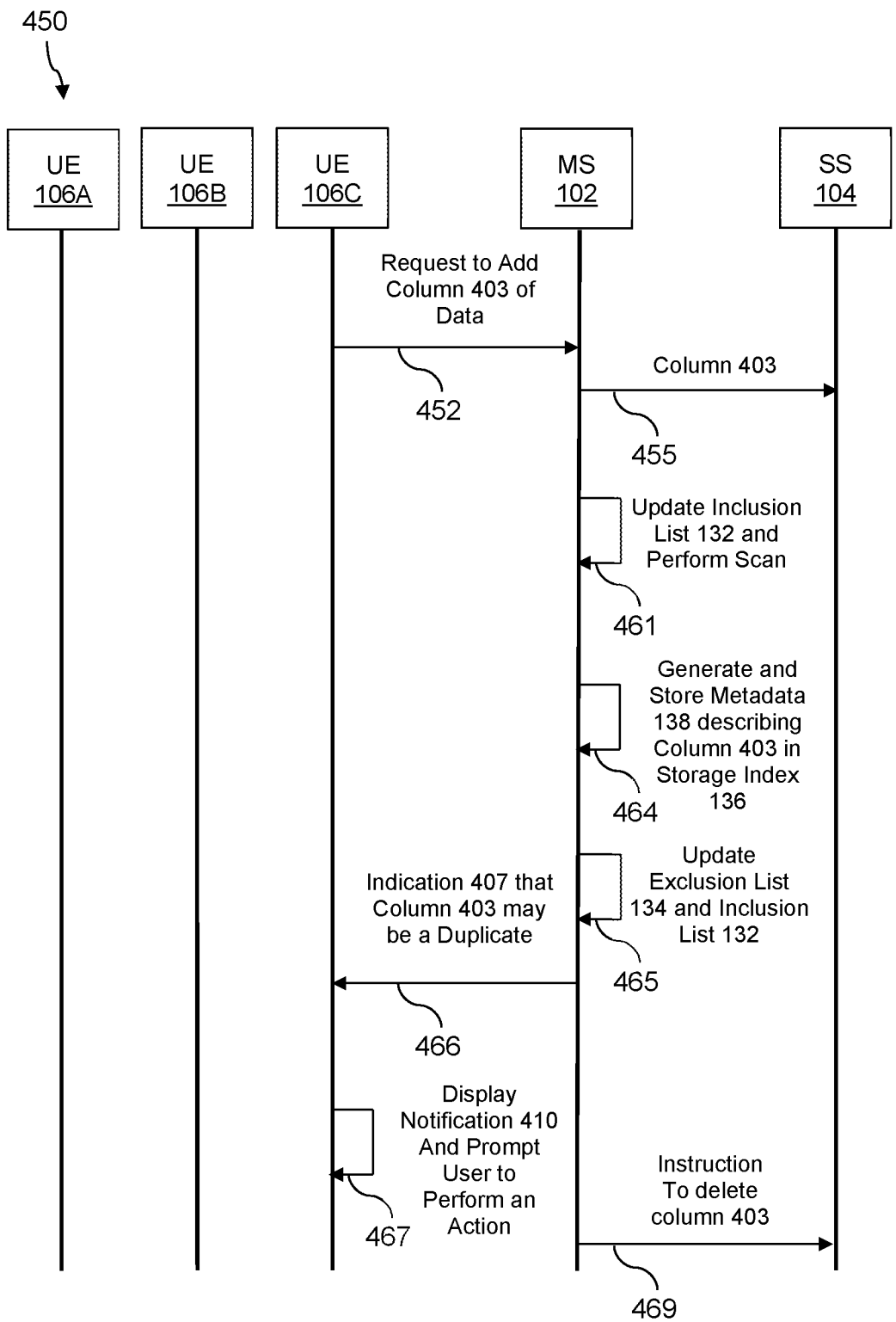
FIG. 4B is a message sequence diagram of a fourth method performed by the system of FIG. 1 to prompt a user to delete duplicate data according to an embodiment of the disclosure

Referring now to FIG. 4B, a message sequence diagram illustrating a second method 450 of processing a request to add a new, duplicate column of data is described. The method 450 may be performed by the UEs 106A-C, the management server 102 (shown in FIG. 4B as the "MS 102"), and the storage server 104 (shown in FIG. 4B as the "SS 104"). For example, method 450 may be performed when the UEs 106A and 106B transmit a request to add the new column 403 of data.

At step 452, UE 106C transmits, to the management server 102, using the UE-to-server API 112, a request to add a new column 403 of data to, for example, the storage container 150C. For example, the request sent at step 452 may include a request to add a new column 403 of billing data to the delta table 152. At step 455, the management server 102 transmits, to the storage server 104, using the server-to-storage API 128, the new column 403 of data with an instruction to store the new column 403 of data in a particular storage container 150A-C or a table 152 (e.g., storage container 150C). The storage server 104 may then store the new column 403 in the relevant table or in a new table of the storage container 150C.

At step 461, in response to receiving the request to add the new column 403, the management server 102 executes the scanner application 118 to update the inclusion list 132 to include the new column 403, and scan the folders 151 to inspect all the tables 152 and columns within the tables 152 of the storage server 104. For example, the scanner application 118 may scan tables 152 in folders 151 of the storage server 104, to determine whether the new column 403 is a duplicate of a column of data already stored at the storage server 104. In the example shown in FIG. 4, the new column 403 may be a duplicate of another column of data existing in the storage server 103. As mentioned above, the new column 403 may be similar to the new column 303 already added to the storage server in method 300 of FIG. 3. For example, the scanner application 118 may determine that the new column 403 is a duplicate of column 303, already stored at the storage server 104, based on the matching metadata 138 (e.g., column names 144 and data formats 149). At step 464, the scanner application or the listener application 120 generates and stores metadata 138 describing the new column 403.

At step 465, the scanner application 118 may update the exclusion list 134 to include the folders 151 of the tables 152 that were just scanned, and update the inclusion list 132 to remove the folders 151 of the tables 152 that were just scanned. At step 466, the management server 102 transmits, to the UE 106C, using the server-to-UE API 126, a response including an indication 407 that the new column 403 may be a duplicate of another column of already existing in the storage server 104. The indication 407 may trigger the UE 106 to prompt the user a user of the UE 106 to perform an action to prevent the new column 403 of data to be stored at the storage server 104. To this end, at step 467, the UE 106C executes the storage application 116 to display a notification 410 using the storage UI 114. At step 469, the management server 102 may transmit, to the storage server 104, using the server-to-storage API 128, an instruction to delete column 403 from the storage container 150C. The deletion may be performed only in response to receiving an instruction from the user, for example, via a selection on the prompt displayed on the storage UI 114, to delete the new column 403 from the storage server 104.

Figure 5:
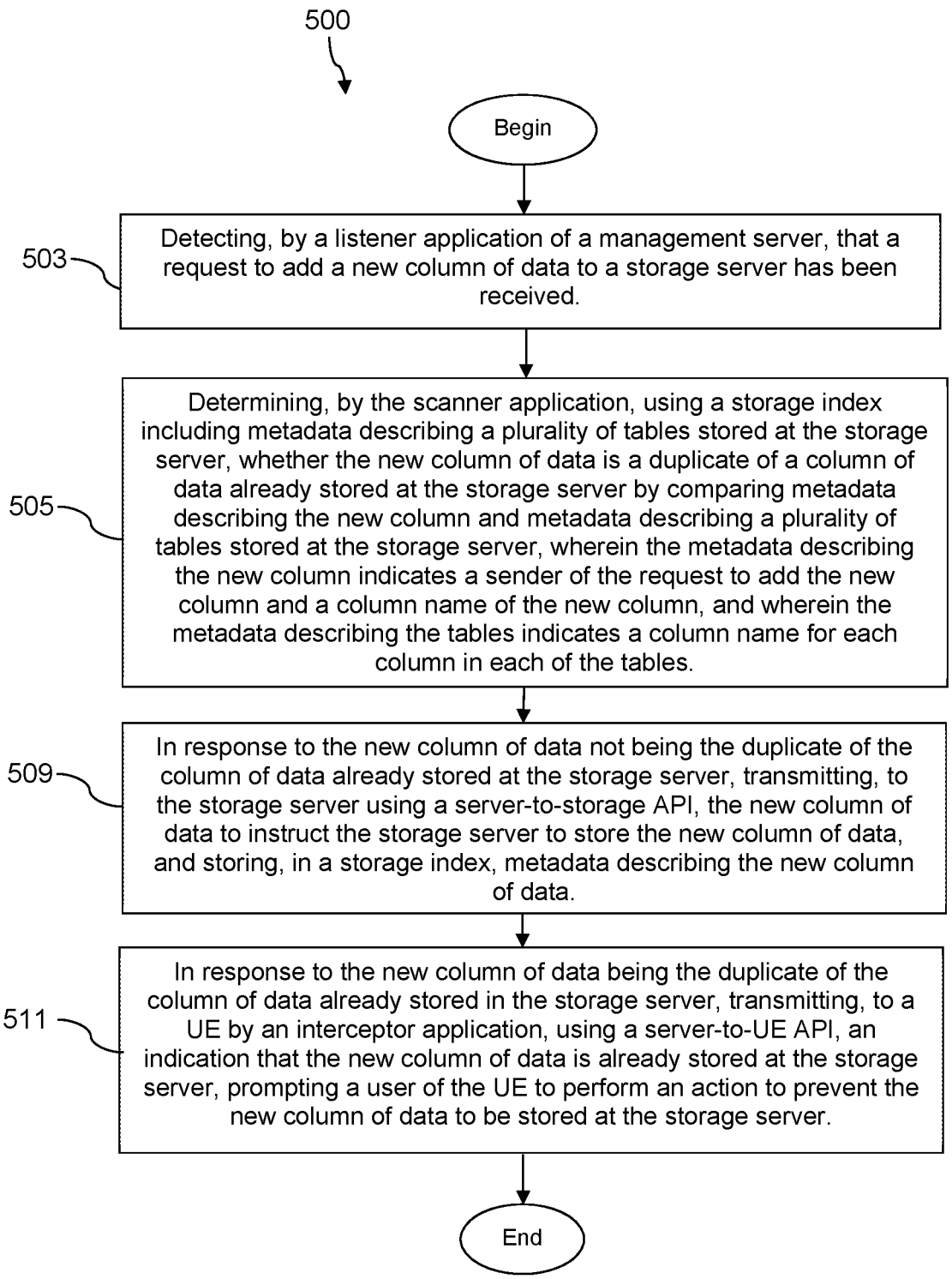
FIG. 5 is a flow chart of a method performed by a management server in the system of FIG. 1 to prevent the storing of duplicate data in a storage server in the system of FIG. 1 according to an embodiment of the disclosure.

Turning now to FIG. 5, a method 500 is described. In an embodiment, the method 500 is a method for performing data management and de-duplication at the storage server 104. The method 500 may be performed by the management server 102 after receiving a request to add a new column 303, 305, or 403 (hereinafter referred to as "new column") to the storage server 104.

At block 503, the method 500 comprises detecting, by a listener application 120 of the management server 102, that a request to add a new column of data to the storage server 104 has been received. In an embodiment, this detection triggers the scanner application 118 to scan the tables 152 in the storage server 104 to determine whether the new column of data already exists in the storage server 104.

At block 505, the method 500 comprises determining, by the scanner application 118, using a storage index 136 including metadata 138 describing a plurality of tables 152 stored at the storage server 104, whether the new column of data is a duplicate of a column of data already stored at the storage server 104. In an embodiment, the scanner application 118 performs this determination by comparing metadata 138 describing the new column and metadata 138 describing the tables 152 stored at the storage server 104. In an embodiment, the metadata 138 describing the new column indicates a sende126r 148 of the request to add the new column and a column name 144 of the new column. In an embodiment, the metadata 138 describing the tables 152 indicates a column name 144 for each column in each of the tables 152.

At block 509, the method 500 comprises transmitting, to the storage server 104 using a server-to-storage API 128, the new column of data in response to the new column of data not being the duplicate of the column of data already stored at the storage server 104. This serves to instruct the storage server 104 to store the new column of data at a relevant storage container 150A-C. At block 509, the method 500 also comprises storing, in the storage index 136, metadata 138 describing the new column of data.

At block 511, method 500 comprises, in response to the new column of data being the duplicate of the column of data already stored in the storage server 104, transmitting, by the interceptor application 124 to a UE 106, using a server-to-UE API 126, an indication that the new column of data is already stored at the storage server 104. In an embodiment, the indication may trigger the UE 106 to prompt 407 a user of the UE 106 to perform an action to prevent the new column of data to be stored at the storage server 104.

Figure 6:
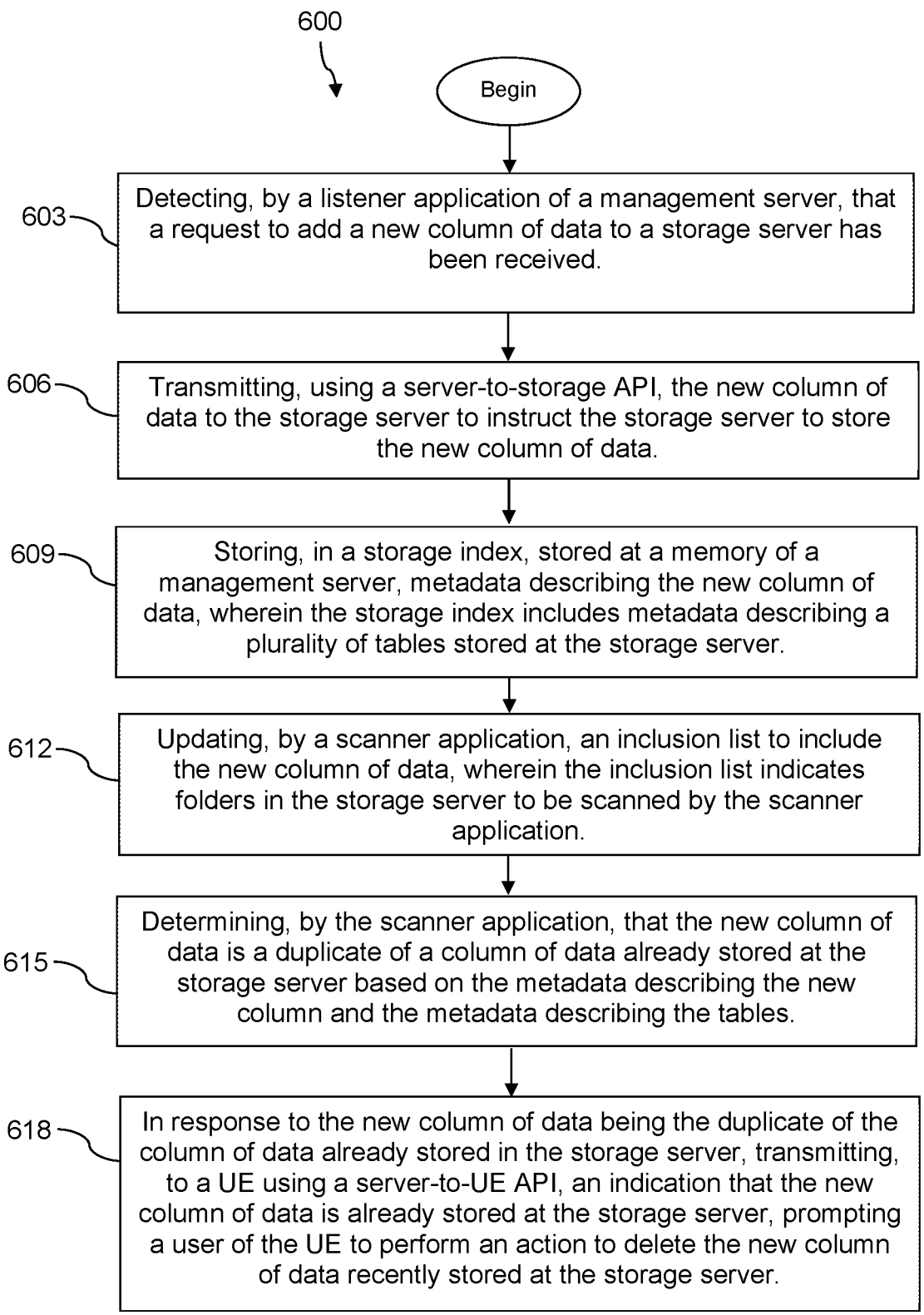
FIG. 6 is a flow chart of a method performed by the management server in the system of FIG. 1 to prompt a user to delete duplicate data from the storage server in the system of FIG. 1 according to an embodiment of the disclosure.

Turning now to FIG. 6, a method 600 is described. In an embodiment, the method 600 is a method for performing data management and de-duplication at the storage server 104. The method 600 may be performed by the management server 102 after receiving a request to add a new column to the storage server 104.

At block 603, the method 600 comprises detecting, by a listener application 120 of the management server 102, that a request to add a new column of data to the storage server 104 has been received. At block 606, the method 600 comprises transmitting, using a server-to-storage API 128, the new column of data to the storage server 104 to instruct the storage server 104 to store the new column of data, for example, in a relevant storage container 150.

At block 609, the method 600 comprises storing, in a storage index 136, stored at a memory 130 of a management server 102, metadata 138 describing the new column of data. In an embodiment, the storage index 136 includes metadata 138 describing a plurality of tables 152 stored at the storage server 104. At block 612, the method 600 comprises updating, by a scanner application 118, an inclusion list 132 to include the new column of data. In an embodiment, the inclusion list 132 indicates folders 151 in the storage server 104 to be scanned by the scanner application 118.

At block 615, the method 600 comprises determining, by the scanner application 118, that the new column of data is a duplicate of a column of data already stored at the storage server 104 based on the metadata 138 describing the new column and the metadata 138 describing the tables 152. At block 618, the method 600 comprises, in response to the new column of data being the duplicate of the column of data already stored in the storage server 104, transmitting, to a UE 106 using a server-to-UE API 126, an indication 407 that the new column of data is already stored at the storage server 104. In an embodiment, the indication 407 triggers the UE 106 to prompting a user of the UE to perform an action to delete the new column of data recently stored at the storage server.

Figure 7:
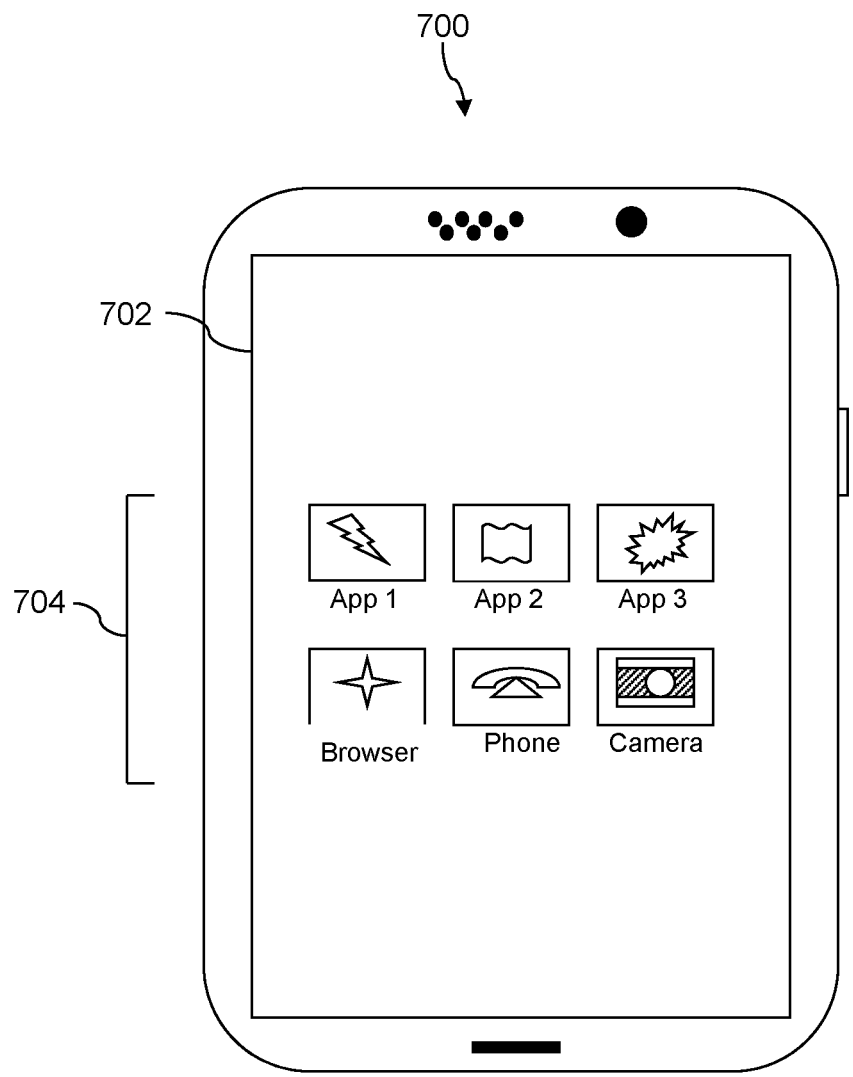
FIG. 7 is an illustration of a mobile communication device, such as the UE in the system of FIG. 1, according to an embodiment of the disclosure.

FIG. 7 depicts the UE 700, which is operable for implementing aspects of the present disclosure, but the present disclosure should not be limited to these implementations. In an embodiment, UEs 103A-C may be handsets similar to the UE 700. Though illustrated as a mobile phone, the UE 700 may take various forms including a wireless handset, a pager, a personal digital assistant (PDA), a gaming device, or a media player. The UE 700 includes a touchscreen display 702 having a touch-sensitive surface for input by a user. A small number of application icons 704 are illustrated within the touch screen display 702. It is understood that in different embodiments, any number of application icons 704 may be presented in the touch screen display 702. In some embodiments of the UE 700, a user may be able to download and install additional applications on the UE 700, and an icon associated with such downloaded and installed applications may be added to the touch screen display 702 or to an alternative screen. The UE 700 may have other components such as electro-mechanical switches, speakers, camera lenses, microphones, input and/or output connectors, and other components as are well known in the art. The UE 700 may present options for the user to select, controls for the user to actuate, and/or cursors or other indicators for the user to direct. The UE 700 may further accept data entry from the user, including numbers to dial or various parameter values for configuring the operation of the handset. The UE 700 may further execute one or more software or firmware applications in response to user commands. These applications may configure the UE 700 to perform various customized functions in response to user interaction. Additionally, the UE 700 may be programmed and/or configured over-the-air, for example from a wireless base station, a wireless access point, or a peer UE 700. The UE 700 may execute a web browser application which enables the touch screen display 702 to show a web page. The web page may be obtained via wireless communications with a base transceiver station, a wireless network access node, a peer UE 700 or any other wireless communication network or system.

Figure 8:
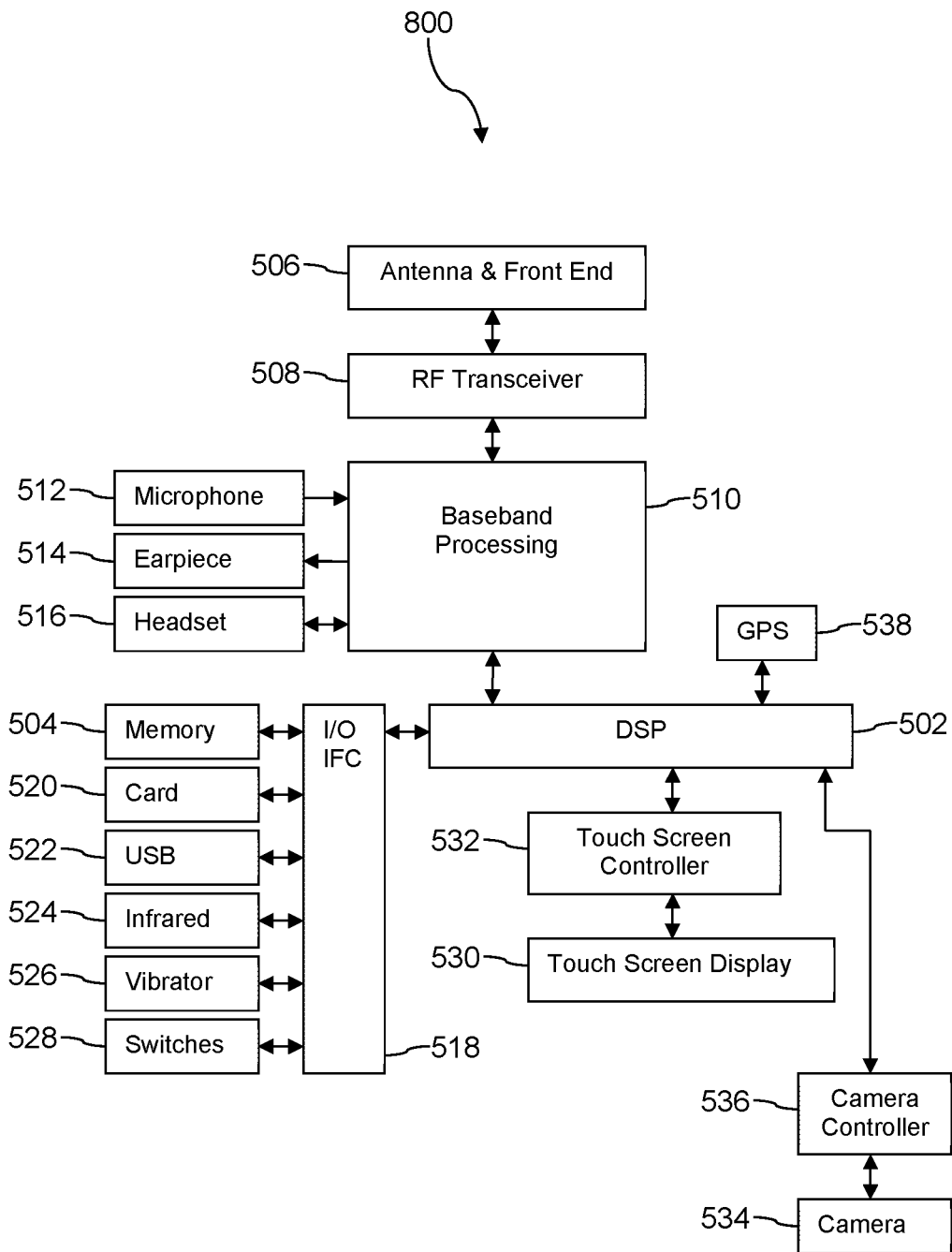
FIG. 8 is a block diagram of a hardware architecture of a mobile communication device, such as the UE in the system of FIG. 1, according to an embodiment of the disclosure.

FIG. 8 shows a block diagram of the UE 800. In an embodiment, UEs 106A-C may be implemented on a hardware device, and include hardware components, similar to UE 800. While a variety of known components of handsets are depicted, in an embodiment a subset of the listed components and/or additional components not listed may be included in the UE 800. The UE 800 includes a digital signal processor (DSP) 502 and a memory 504. As shown, the UE 800 may further include one or more antenna and front end unit 506, a one or more radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen display 530, a touch screen controller 532, a camera 534, a camera controller 536, and a global positioning system (GPS) receiver 538. In an embodiment, the UE 800 may include another kind of display that does not provide a touch sensitive screen. In an embodiment, the UE 800 may include both the touch screen display 530 and additional display component that does not provide a touch sensitive screen. In an embodiment, the DSP 502 may communicate directly with the memory 504 without passing through the input/output interface 518. Additionally, in an embodiment, the UE 800 may comprise other peripheral devices that provide other functionality.

The DSP 502 or some other form of controller or central processing unit operates to control the various components of the UE 800 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 800 to function as a peripheral device to exchange information with a personal computer or other computer system. The infrared port 524 and other optional ports such as a Bluetooth® interface or an IEEE 802.11 compliant wireless interface may enable the UE 800 to communicate wirelessly with other nearby handsets and/or wireless base stations.

In an embodiment, one or more of the radio transceivers is a cellular radio transceiver. A cellular radio transceiver promotes establishing a wireless communication link with a cell site according to one or more of a 5G, a long term evolution (LTE), a code division multiple access (CDMA), a global system for mobile communications (GSM) wireless communication protocol. In an embodiment, one of the radio transceivers 508 may comprise a near field communication (NFC) transceiver. The NFC transceiver may be used to complete payment transactions with point-of-sale terminals or other communications exchanges. In an embodiment, each of the different radio transceivers 508 may be coupled to its own separate antenna. In an embodiment, the UE 800 may comprise a radio frequency identify (RFID) reader and/or writer device.

The switches 528 may couple to the DSP 502 via the input/output interface 518 to provide one mechanism for the user to provide input to the UE 800. Alternatively, one or more of the switches 528 may be coupled to a motherboard of the UE 800 and/or to components of the UE 800 via a different path (e.g., not via the input/output interface 518), for example coupled to a power control circuit (power button) of the UE 800. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 800 to determine its position.

Figure 9A:
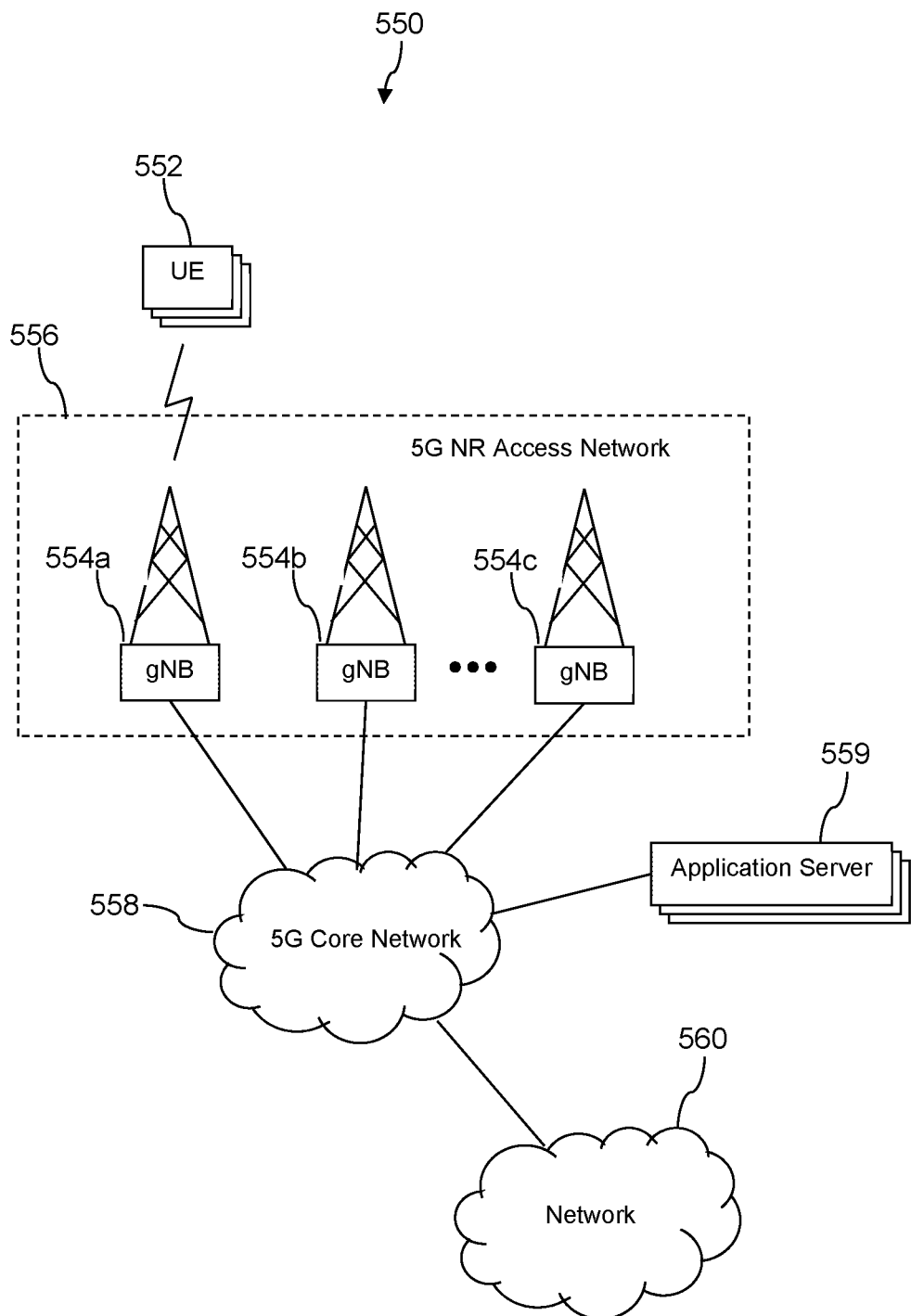
FIGS. 9A-B are block diagrams illustrating a communication system similar to the system of FIG. 1 according to an embodiment of the disclosure.

Turning now to FIG. 9A, an exemplary communication system 550 is described. In an embodiment, the communication system 550 may be implemented in the system 100 of FIG. 1. The communication system 550 includes a number of access nodes 554 that are configured to provide coverage in which UEs 552 (e.g., UEs 106A-C) such as cell phones, tablet computers, machine-type-communication devices, tracking devices, embedded wireless modules, and/or other wirelessly equipped communication devices (whether or not user operated), can operate. The access nodes 554 may be said to establish an access network 556. The access network 556 may be referred to as RAN in some contexts. In a 5G technology generation an access node 554 may be referred to as a gigabit Node B (gNB). In 4G technology (e.g., LTE technology) an access node 554 may be referred to as an eNB. In 3G technology (e.g., CDMA and GSM) an access node 554 may be referred to as a base transceiver station (BTS) combined with a base station controller (BSC). In some contexts, the access node 554 may be referred to as a cell site or a cell tower. In some implementations, a picocell may provide some of the functionality of an access node 554, albeit with a constrained coverage area. Each of these different embodiments of an access node 554 may be considered to provide roughly similar functions in the different technology generations.

In an embodiment, the access network 556 comprises a first access node 554a, a second access node 554b, and a third access node 554c. It is understood that the access network 556 may include any number of access nodes 554. Further, each access node 554 could be coupled with a core network 558 that provides connectivity with various application servers 559 and/or a network 560. In an embodiment, at least some of the application servers 559 may be located close to the network edge (e.g., geographically close to the UE 552 and the end user) to deliver so-called "edge computing." The network 560 may be one or more private networks, one or more public networks, or a combination thereof. The network 560 may comprise the public switched telephone network (PSTN). The network 560 may comprise the Internet. With this arrangement, a UE 552 within coverage of the access network 556 could engage in air-interface communication with an access node 554 and could thereby communicate via the access node 554 with various application servers and other entities.

The communication system 550 could operate in accordance with a particular radio access technology (RAT), with communications from an access node 554 to UEs 552 defining a downlink or forward link and communications from the UEs 552 to the access node 554 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHz), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 554 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 554 could define an air interface configured in a specific manner to define physical resources for carrying information wirelessly between the access node 554 and UEs 552.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 552.

In addition, certain resource elements on the example air interface could be reserved for special purposes. For instance, on the downlink, certain resource elements could be reserved to carry synchronization signals that UEs 552 could detect as an indication of the presence of coverage and to establish frame timing, other resource elements could be reserved to carry a reference signal that UEs 552 could measure in order to determine coverage strength, and still other resource elements could be reserved to carry other control signaling such as PRB-scheduling directives and acknowledgement messaging from the access node 554 to served UEs 552. And on the uplink, certain resource elements could be reserved to carry random access signaling from UEs 552 to the access node 554, and other resource elements could be reserved to carry other control signaling such as PRB-scheduling requests and acknowledgement signaling from UEs 552 to the access node 554.

The access node 554, in some instances, may be split functionally into a radio unit (RU), a distributed unit (DU), and a central unit (CU) where each of the RU, DU, and CU have distinctive roles to play in the access network 556. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 9B:
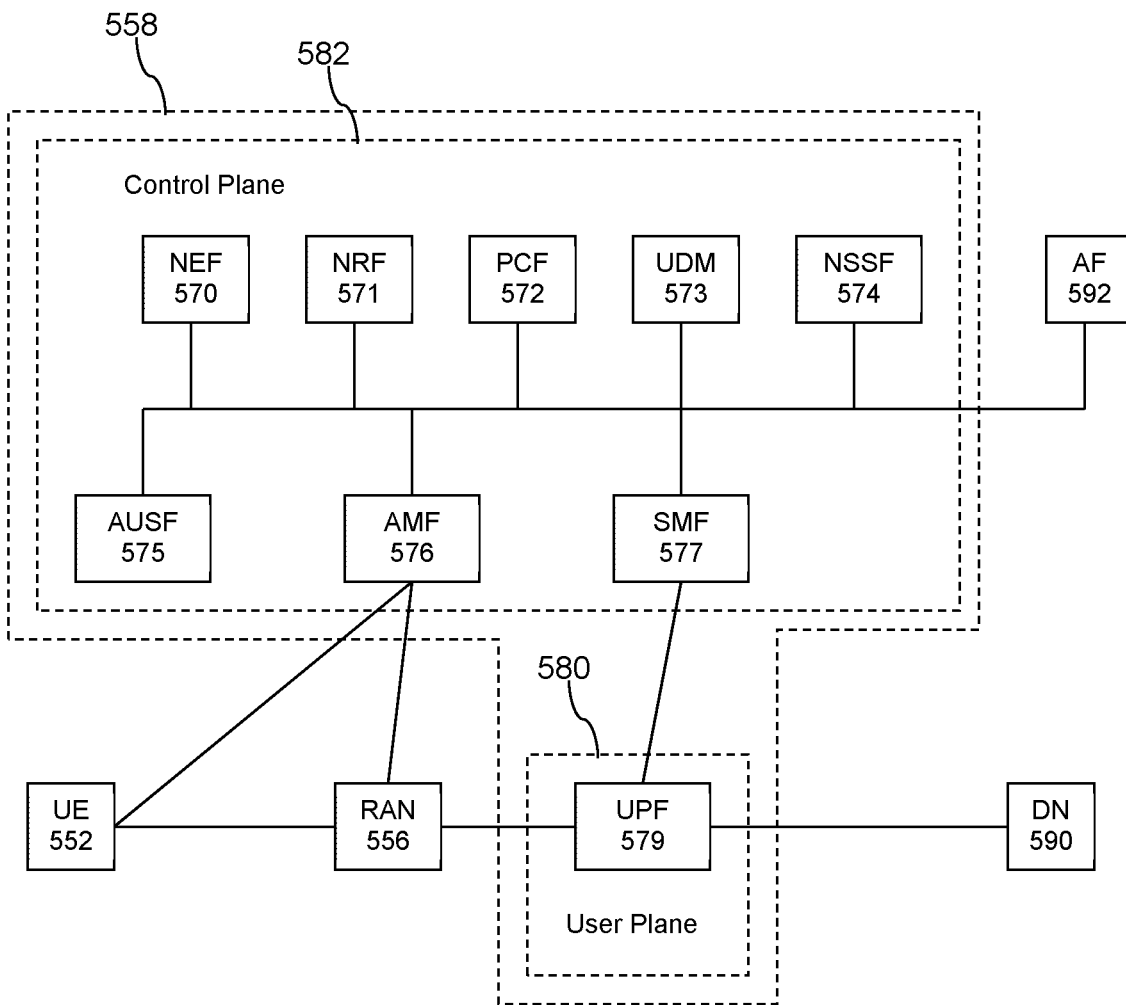

Turning now to FIG. 9B, further details of the core network 558 are described. In an embodiment, the core network 558 is a 5G core network. 5G core network technology is based on a service based architecture paradigm. Rather than constructing the 5G core network as a series of special purpose communication nodes (e.g., an HSS node, a MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 579, an authentication server function (AUSF) 575, an access and mobility management function (AMF) 576, a session management function (SMF) 577, a network exposure function (NEF) 570, a network repository function (NRF) 571, a policy control function (PCF) 572, a unified data management (UDM) 573, a network slice selection function (NSSF) 574, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 558 may be segregated into a user plane 580 and a control plane 582, thereby promoting independent scalability, evolution, and flexible deployment.

The UPF 579 delivers packet processing and links the UE 552, via the access network 556, to a data network 590 (e.g., the network 560 illustrated in FIG. 9A). The AMF 576 handles registration and connection management of non-access stratum (NAS) signaling with the UE 552. Said in other words, the AMF 576 manages UE registration and mobility issues. The AMF 576 manages reachability of the UEs 552 as well as various security issues. The SMF 577 handles session management issues. Specifically, the SMF 577 creates, updates, and removes (destroys) protocol data unit (PDU) sessions and manages the session context within the UPF 579. The SMF 577 decouples other control plane functions from user plane functions by performing dynamic host configuration protocol (DHCP) functions and IP address management functions. The AUSF 575 facilitates security processes.

The NEF 570 securely exposes the services and capabilities provided by network functions. The NRF 571 supports service registration by network functions and discovery of network functions by other network functions. The PCF 572 supports policy control decisions and flow based charging control. The UDM 573 manages network user data and can be paired with a user data repository (UDR) that stores user data such as customer profile information, customer authentication number, and encryption keys for the information. An application function 592, which may be located outside of the core network 558, exposes the application layer for interacting with the core network 558. In an embodiment, the application function 592 may be execute on an application server 559 located geographically proximate to the UE 552 in an "edge computing" deployment mode. The core network 558 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 574 can help the AMF 576 to select the network slice instance (NSI) for use with the UE 552.

Figure 10:
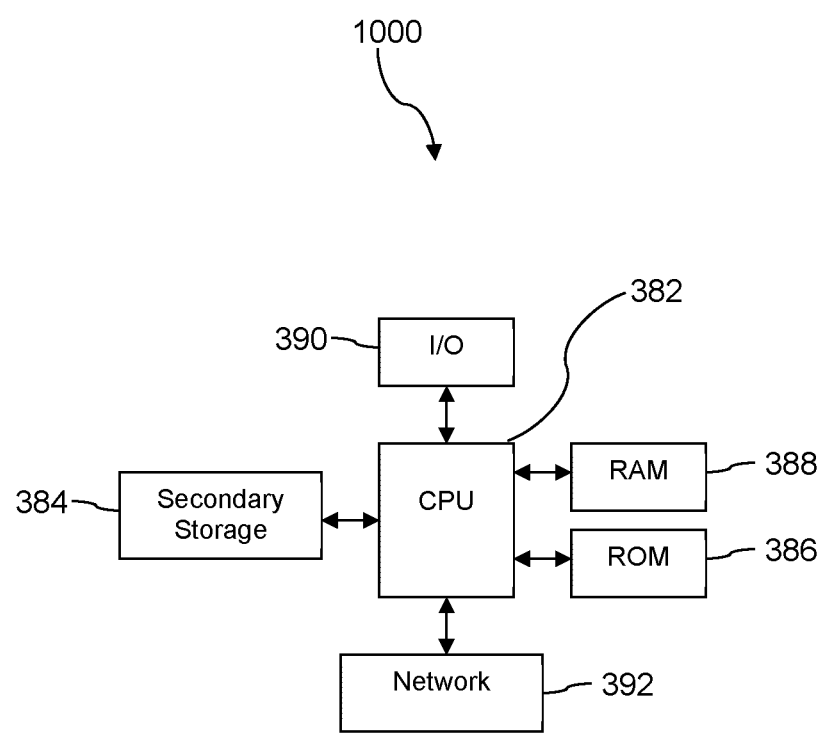
FIG. 10 is a block diagram of a computer system implemented within the system of FIG. 1 or FIGS. 9A-B according to an embodiment of the disclosure.

FIG. 10 illustrates a computer system 1000 suitable for implementing one or more embodiments disclosed herein. In an embodiment, one or more of the management server 102, storage server 104, and UEs 106A-C may be implemented as the computer system 1000. The computer system 1000 includes a processor 382 (which may be referred to as a central processor unit or CPU) that is in communication with memory devices (e.g., non-transitory memory 130) including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 1000, at least one of the CPU 382, the RAM 388, and the ROM 386 are changed, transforming the computer system 1000 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 1000 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), Wi-Fi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 1000 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 1000 to provide the functionality of a number of servers that is not directly bound to the number of computers in the computer system 1000. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 1000, at least portions of the contents of the computer program product to the secondary storage 384, to the ROM 386, to the RAM 388, and/or to other non-volatile memory and volatile memory of the computer system 1000. The processor 382 may process the executable instructions and/or data structures in part by directly accessing the computer program product, for example by reading from a CD-ROM disk inserted into a disk drive peripheral of the computer system 1000. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 1000.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 1000 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

EXAMPLES

As disclosed herein, the embodiments disclosed herein keep a data inventory of the tables stored in the storage server in the form of a storage index, and the storage index stores metadata describing the tables. The management server uses the metadata in the storage index to determine duplicates or possible duplicates of columns of data, which can be used to prompt users to prevent storage of duplicate data, delete duplicate data, archive duplicate data, or even prevent migration of duplicate data.

The following examples serve to further illustrate the steps of the methods 200, 300, 400, 450, 500, and 600. As should be appreciated, the example below serves to merely illustrate one specific implementation of the embodiments disclosed herein, but should not otherwise be interpreted to further limit the embodiments disclosed herein in any form or fashion.

In one case, MICROSOFT AZURE DATA LAKE STORAGE (ADLS) generation 2 (gen 2) may be used to manage the data stored in the storage server. In an embodiment, the scanner application, listener application, and interceptor application may all be implemented as part of ADSL gen 2. First, the scanner application 118 scans ADLS storage containers, and creates list of newly created folder which do not exists in exclusion list. The scanning may include the following:

a. lstCntr=dbutils.fs.ls{ContainerName} // this will provide list of all folders to browse for delta tables.

b. Scan folder path and if they contain_delta_log/ in the name then it indicates it is delta table. All delta tables create delta log.

c. Save these folder path and delta table name in inclusion List table

Next, the query below may be used to gather the table creation date, last access date and size for each row ie. delta table listed in adls_details table.

```
Data_catalog.adls_details contain list of delta tables with their physical
path.
    DESCRIBE DETAIL delta.'<path-to-table>'
Return information about schema, partitioning, table size, and so
on.
if 'delta_log/' in str(path[1]):
    tableName = "dataops_data_catalog.adls_details"
    sqlcmd = "DESCRIBE DETAIL
DELTA.'{ }'".format(path[0]).replace('_delta_log/', '')
    df = spark.sql(sqlcmd).withColumn("TIME_STAMP",
current_timestamp( ))
f.write.format("delta").mode("append").saveAsTable(tableName)
    print('included ' + path[0])
    lstDelta.append(path[0])
elif '/' in str(path[1]) and '=' not in str(path[1]):
    print('excluded ' + path[0])
    ScanAdlsForDatasets(path[0], mode, level + 1)
```

Next, the command below may be used to gather column level details and a row count for each delta table.

```
dfTable = spark.sql(query)
dfDeltaData = spark.read.format("delta").load(Table_path +"/")
lsCol = dfDeltaData.dtypes
dfCol = spark.createDataFrame(lsCol)
dfCol =
dfCol.withColumnRenamed('_1','COLUMN_NAME').withColumnRenamed('_2','CO
LUMN_DATA_TYPE')
    dfdatasetcolumn = dfTable.crossJoin(dfCol)
dfColumndata=dfdatasetcolumn.select("STORAGE_BUCKET","TABLE_NAME","T
ABLE_TYPE","LOB","TEAM","USECASE","TABLE_LOCATION","COLUMN_NAM
E","COLUMN_DATA_TYPE","TAGS")
dfFinalCrawlerdata =
dfFinalCrawlerdata.withColumn('ROW_COUNT',lit(TargetRowCount).cast('bigint'))
dfFinalCrawlerdata=dfFinalCrawlerdata.select("STORAGE_BUCKET","TABLE_NA
ME","TABLE_TYPE","LOB","TEAM","USECASE","TABLE_LOCATION","TABLE_
CREATED_TIMESTAMP","TABLE_LAST_ACCESS_TIMESTAMP","SIZE_IN_BY
TES","COLUMN_NAME","COLUMN_DATA_TYPE","TAGS","ROW_COUNT")
dfFinalCrawlerdata = dfFinalCrawlerdata.drop_duplicates( )
```

The steps above may be repeated for each folder in the inclusive list. The inclusive list may be copied to exclusion list to avoid rescanning same folder (optimization technique to avoid duplicates). In one case, a mule job pulls all above catalog information (e.g., the metadata 138 in the storage index 136) in COLLIBRA, thus allowing users to view ADLS inventory. This scanning activity is the foundation for lot of governance modules within the storage system 104.

A similar method may be used for other for parquet and CSV files, so long as the files are in a table format. The embodiments disclosed herein are agnostic to the types of tables files and the host/application used to manage the data stored in the storage server. For example, a similar method may be used in storage servers operated using SNOWFLAKE as well. The scanning and duplication detection methods presented herein provides a real-time view of the data stored in the storage system, which may be used as the foundation for other storage related governance and accelerators.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for performing data management and de-duplication, comprising:
a management server, comprising:
a non-transitory memory configured to store:
instructions; and
a storage index indicating metadata describing a plurality of tables stored at a storage server;
a processor configured to execute the instructions, which cause the processor to be configured to:
detect, by a listener application of the management server, that a request to add a new column of data to a storage server has been received;
determine, by a scanner application of the management server, that the new column of data is a duplicate of a column of data already stored at the storage server by comparing metadata describing the new column and the metadata describing the tables stored at the storage server, wherein the metadata describing the new column indicates a sender of the request to add the new column and a column name of the new column and the metadata describing the tables stored at the storage server describes a column name and a data format of each column in each table stored at the storage server; and
in response to the new column of data being the duplicate of the column of data already stored in the storage server:
generate, by an interceptor application of the management server, an indication that the new column of data is already stored at the storage server; and
transmit, to a user equipment (UE) using a server-to-UE application programming interface, the indication that the new column of data is already stored at the storage server, prompting a user of the UE to perform an action to prevent the new column of data to be stored at the storage server;
wherein the storage server is communicatively coupled to the management server, and wherein the storage server is configured to store the tables.

2. The system of claim 1, wherein the metadata describing the tables comprises at least one of a table name, a physical path to a table within the storage server, a column name, a row count, a size, a timestamp indicating a last access of the table, or a data format of data in the table.

3. The system of claim 2, wherein the metadata describing the tables comprises a data format of each column in each table stored at the storage server, wherein the metadata describing the new column comprises a data format of the new column, wherein the instructions further cause the processor to determine, by the scanner application, that the new column of data is the duplicate in response to the column name and the data format of the new column matching the column name and the data format of one or more tables stored at the storage server.

4. The system of claim 1, wherein the storage server comprises a plurality of storage containers, wherein each storage container comprises a plurality of folders, and wherein one or of the folders comprises the tables.

5. The system of claim 1, wherein the non-transitory memory is further configured to store an exclusion list indicating one or more folders that should not be scanned by the management server.

6. The system of claim 1, wherein the non-transitory memory is further configured to store an inclusion list indicating one or more folders that is to be scanned by the management server.

7. The system of claim 1, wherein the storage server comprises a second non-transitory memory configured to store a plurality of folders, wherein one or more of the folders include a table, wherein the instructions further cause the processor to be configured to:
add, by the scanner application, the one or more of the folders to an inclusion list indicating folders that is to be scanned by the management server;
scan, by the scanner application, the one or more folders to inspect tables within the one or more folders;
generate, by the scanner application, the metadata describing the one or more folders;
update, by the scanner application, the inclusion list to remove the one or more folders; and
update, by the scanner application, an exclusion list to add the one or more folders, wherein the exclusion list indicates folders should not be scanned by the management server.

8. A method performed by a management server for performing data management and de-duplication at a storage server, wherein the method comprises:
detecting, by a listener application of the management server, that a request to add a new column of data to the storage server has been received;
determining, by a scanner application of the management server, using a storage index including metadata describing a plurality of tables stored at the storage server, whether the new column of data is a duplicate of a column of data already stored at the storage server by comparing metadata describing the new column and metadata describing a plurality of tables stored at the storage server, wherein the metadata describing the new column indicates a sender of the request to add the new column and a column name of the new column, and wherein the metadata describing the tables indicates a column name for each column in each of the tables;

in response to the new column of data not being the duplicate of the column of data already stored at the storage server:

transmitting, to the storage server using a server-to-storage application program interface, the new column of data, to instruct the storage server to store the new column of data; and storing, in the storage index in a memory of the management server, the metadata describing the new column of data; and in response to the new column of data being the duplicate of the column of data already stored in the storage server, transmitting, by an interceptor application of the management server, using a server-to-user equipment (UE) application programming interface, an indication to a UE that the new column of data is already stored at the storage server, prompting a user of the UE to perform an action to prevent the new column of data from being stored at the storage server.

9. The method of claim 8, wherein the metadata describing the tables comprises at least one of a data format, a table name, a physical path to a table within the storage server, a row count, a size, or a timestamp indicating a last access of the table.

10. The method of claim 8, wherein determining whether the new column of data is the duplicate of the column of data already stored at the storage server comprises determining, by the scanner application, that the new column of data is the duplicate in response to determining that the column name of the new column matches the column name of one or more tables stored at the storage server.

11. The method of claim 8, wherein the metadata of the tables further indicates a data format of each column in the tables, wherein determining whether the new column of data is the duplicate of the column of data already stored at the storage server comprises determining, by the scanner application, that the new column of data is the duplicate in response to determining that the column name and the data format of the new column matches the column name and the data format of one or more tables stored at the storage server.

12. The method of claim 8, wherein comparing the metadata describing the new column and the metadata describing the tables stored at the storage server is performed using a string pattern matching method.

13. The method of claim 8, further comprising storing an exclusion list and an inclusion list, wherein the exclusion list indicates one or more folders that should not be scanned by the management server, and wherein the inclusion list indicates one or more folders that is to be scanned by the management server.

14. The method of claim 13, further comprising
adding, by the scanner application, one or more folders in the storage server to an inclusion list indicating folders that is to be scanned by the management server, wherein the one or more folders each include a table;
scan, by the scanner application, the one or more folders to inspect tables within the one or more folders;
generate, by the scanner application, the metadata describing the one or more folders;
update, by the scanner application, the inclusion list to remove the one or more folders; and
update, by the scanner application, an exclusion list to add the one or more folders, wherein the exclusion list indicates folders should not be scanned by the management server.

15. A management server for performing data management and de-duplication on a storage server, wherein the management server comprises:
a server-to-user equipment (UE) application programming interface;
a non-transitory memory configured to store:
instructions; and
a storage index indicating metadata describing a plurality of tables stored at a storage server; and
a processor configured to execute the instructions, which cause the processor to be configured to:
detect, by a listener application of the management server, that a request to add a new column of data to the storage server has been received;
transmit, using the server-to-storage application programming interface, the new column of data to the storage server to instruct the storage server to store the new column of data;
store, in the storage index, metadata describing the new column of data;
update, by a scanner application of the management server, an inclusion list to include the new column of data, wherein the inclusion list indicates folders in the storage server to be scanned by the scanner application;
determine, by the scanner application, that the new column of data is a duplicate of a column of data already stored at the storage server based on the metadata describing the new column and the metadata describing the tables; and
transmit, to a UE, using the server-to-UE application programming interface, an indication that the new column of data is already stored at the storage server, prompting a user of the UE to perform an action to delete the new column of data recently stored at the storage server.

16. The management server of claim 15, wherein the metadata describing the tables comprises at least one of a table name, a physical path to a table within the storage server, a column name, a row count, a size, a timestamp indicating a last access of the table, or a data format of data in the table.

17. The management server of claim 15, wherein the metadata describing the tables comprises a column name and a data format of each column in each table stored at the storage server, wherein the metadata describing the new column comprises a column name and a data format of the new column, wherein the instructions further cause the processor to determine, by the scanner application, that the new column of data is the duplicate in response to the column name and the data format of the new column matching the column name and the data format of one or more tables stored at the storage server.

18. The management server of claim 15, wherein the non-transitory memory is further configured to store an exclusion list indicating one or more folders that should not be scanned by the management server.

19. The management server of claim 15, wherein the non-transitory memory is further configured to store an inclusion list indicating one or more folders that is to be scanned by the management server.

20. The management server of claim 15, wherein the instructions further cause the processor to be configured to:

add, by the scanner application, one or more folders in the storage server to an inclusion list indicating folders that is to be scanned by the management server, wherein the one or more folders each include a table;

scan, by the scanner application, the one or more folders to inspect tables within the one or more folders;

generate, by the scanner application, the metadata describing the one or more folders;

update, by the scanner application, the inclusion list to remove the one or more folders; and update, by the scanner application, an exclusion list to add the one or more folders, wherein the exclusion list indicates folders should not be scanned by the management server.

* * * * *